United States Patent
Higashi

(10) Patent No.: US 7,254,460 B1
(45) Date of Patent: Aug. 7, 2007

(54) NUMERICAL CONTROL SYSTEM, AND METHOD OF ESTABLISHING COMMUNICATION TIMING IN NUMERICAL CONTROL SYSTEM

(75) Inventor: Kazuhiko Higashi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/031,705

(22) PCT Filed: May 22, 2000

(86) PCT No.: PCT/JP00/03243

§ 371 (c)(1),
(2), (4) Date: Jan. 22, 2002

(87) PCT Pub. No.: WO01/90832

PCT Pub. Date: Nov. 29, 2001

(51) Int. Cl.
*G05B 19/414* (2006.01)
*H02P 1/00* (2006.01)
*H04L 5/14* (2006.01)
*G06F 19/00* (2006.01)

(52) U.S. Cl. ............. 700/169; 700/177; 318/85; 370/294

(58) Field of Classification Search ........... 700/169, 700/177; 318/85; 370/294
See application file for complete search history.

(56) References Cited

U.S. PATENT DOCUMENTS

| | | | |
|---|---|---|---|
| 5,822,615 A | 10/1998 | Yamashita et al. | |
| 5,946,215 A * | 8/1999 | Mito | 700/169 |
| 5,949,754 A * | 9/1999 | Takahashi | 370/222 |
| 5,963,444 A * | 10/1999 | Shidara et al. | 700/7 |
| 5,990,638 A * | 11/1999 | Aoyama et al. | 318/85 |
| 6,182,163 B1 | 1/2001 | Yamashita et al. | |

FOREIGN PATENT DOCUMENTS

| | | |
|---|---|---|
| DE | 197 56 918 A1 | 1/1999 |
| EP | 0 208 998 A2 | 1/1987 |
| JP | 62-22110 | 1/1987 |
| JP | 8-328636 | 12/1996 |
| JP | 9-73310 | 3/1997 |
| JP | 10-83215 A | 3/1998 |
| JP | 11-231923 A | 8/1999 |

OTHER PUBLICATIONS

Korean Patent Office Search Report.

* cited by examiner

*Primary Examiner*—Ryan A Jarrett
(74) *Attorney, Agent, or Firm*—Sughrue Mion, PLLC

(57) ABSTRACT

Performing communications between numerical control apparatus 1a and peripheral devices (composed of at least one of a servo amplifier 2a, a spindle amplifier 3a and a remote I/O unit 4a) by connecting a numerical control apparatus 1a and peripheral devices using a communication cable composed of a pair of data transmission cables 7 for transmission and a pair of data transmission cables 8, in a numerical control system having numerical control apparatus 1a and peripheral devices composed of at least one of a servo amplifier 2a, a spindle amplifier 3a and a remote I/O unit 4a.

1 Claim, 22 Drawing Sheets

FIG. 7 (a)

| PORT CONNECTION CONFIRMATION COMMAND | ~ 30 |

FIG. 7 (b)

| RESPONSE TO A PORT CONNECTION CONFIRMATION COMMAND | ~ 31 |

FIG. 7 (c)

| PORT INFORMATION COMMAND | ~ 32a |
|---|---|
| I/O CODE | ~ 32b |
| SERVO CODE | ~ 32c |
| SPINDLE CODE | ~ 32d |

FIG. 7 (d)

| NODE COUNT NOTICE COMMAND | ~ 33a |
|---|---|
| NODE COUNT | ~ 33b |
| STATION ADDRESS | ~ 33c |

FIG. 7 (e)

| COMMUNICATION TIMING SETUP COMMAND | ~ 34a |
|---|---|
| RECEPTION TIMING | ~ 34b |
| TRANSMISSION TIMING OF I/O | ~ 34c |
| TRANSMISSION TIMING OF SERVO AMPLIFIER | ~ 34d |
| TRANSMISSION TIMING OF SPINDLE | ~ 34e |

FIG. 21 (a) RELATED ART
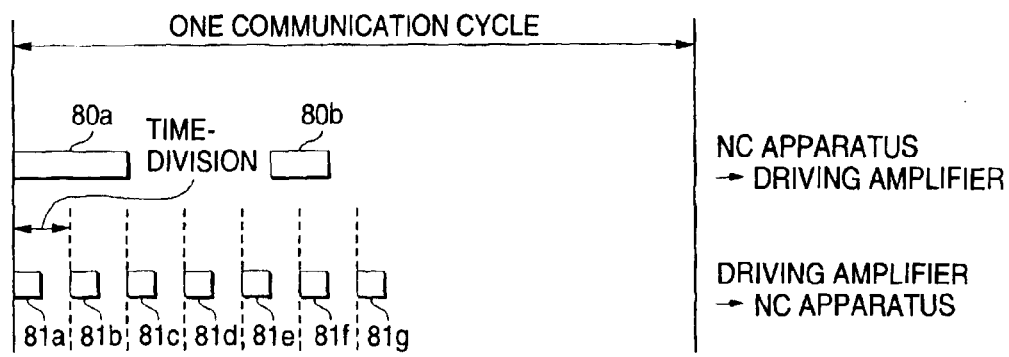
FIG. 21 (b) RELATED ART
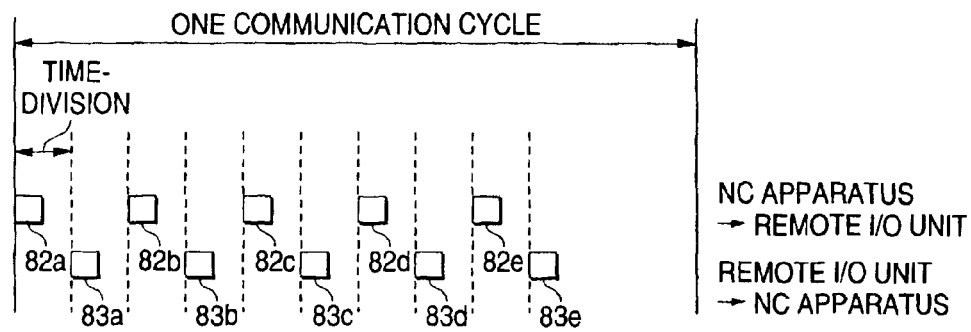

US 7,254,460 B1

NUMERICAL CONTROL SYSTEM, AND METHOD OF ESTABLISHING COMMUNICATION TIMING IN NUMERICAL CONTROL SYSTEM

TECHNICAL FIELD

The present invention relates to a numerical control system (hereinafter referred to as an NC system) wherein numerical control (hereinafter referred to as NC) apparatus and peripheral devices composed of at least one of a servo amplifier, a spindle amplifier and a remote I/O unit are serially connected or daisy-chained by using a communication cable composed of two data transmission cables, one for transmission and one for reception, in order to perform time-division-based communications between the numerical control apparatus and the peripheral devices, and a method for setting a communication timing in the numerical control system.

BACKGROUND OF THE INVENTION

FIG. 18 shows a configuration of NC apparatus as a related art example, where components in the NC apparatus are interconnected via a network. In the figure, a numeral 50 represents a numerical controller (hereinafter referred to as an NC section), 51 numerical control means (hereinafter referred to as NC means) for controlling the entire NC apparatus, 52 PMC control means for controlling a machine tool, 53 a first network controller for controlling a network 60, 54a, 54b shaft controllers, 55a, 55b shaft control means for controlling a servo driving system, 56a, 56b second network controllers for controlling the network 60, 57 a screen controller, 58 screen control means for controlling I/O apparatus such as a CRT/MDI, and 59 a third network controller for controlling the network 60. The NC apparatus is composed of an NC section 50, shaft controllers 54a, 54b, and a screen controller 57. These components are interconnected via the network 60.

FIG. 19 shows a connection between NC apparatus, driving amplifiers and remote I/O units as a related art example. In the figure, a numeral 61 represents NC apparatus, 62 (62a, 62b) servo amplifiers for driving a servo motor (not shown), 63 (63a, 63b) spindle amplifiers for driving a spindle motor (not shown), 64 (64a, 64b) remote I/O units as external I/Os of the NC apparatus 61, and 65 (65a, 65b) line terminals. A numeral 66 (66a–66f) represents ID setup switches mounted on the servo amplifiers 62, spindle amplifiers 63 and remote I/O units 64 connected to the NC apparatus 61 in order to assign a station address and a communication time. A numeral 67 (67a, 67b) represents a communication hardware setup switches mounted on the remote I/O units.

A numeral 70 represents a data transmission cable for communications from the NC apparatus 61 to the servo amplifiers 62 and the spindle amplifiers 63 (hereinafter referred to as driving amplifiers), 71 a data transmission cable for communications from the driving amplifiers to the NC apparatus 61, 72 a data transmission cable for an emergency stop signal, and 73 a data transmission cable for a servo alarm. A servo communication line 74 is composed of four pairs of the aforementioned data transmission cables 70 through 73. A remote I/O communication line 76 is composed of a data transmission cable 75 for communications between the NC apparatus and the remote I/O units.

The NC apparatus 61 is connected to the driving amplifiers (servo amplifiers 62, spindle amplifiers 63) and the servo communication lines 74 and the connection is terminated by the line terminal 65a. The NC apparatus is connected to the remote I/O units 64 and the remote I/O communication line 76 and the connection is terminated by the line terminal 65b.

FIG. 20 shows a serial connection between NC apparatus and driving amplifiers as a related art example. In the figure, a numeral 61 represents NC apparatus, 62 (62a, 62b) servo amplifiers 63 (63a, 63b) spindle amplifiers, 77 a transmission controller, and 78 a receiving controller. As shown in the figure, the NC apparatus 61, the servo amplifiers 62 (62a, 62b) and the spindle amplifiers 63 (63a, 63b) each has a transmission controller 77 and a receiving controller 78 used as a pair.

FIG. 21 shows communications in the NC system (one communication cycle) as a related art example. FIG. 21(a) shows communications between NC apparatus and driving amplifiers (one communication cycle). FIG. 21(b) shows communications between NC apparatus and remote I/O units (one communication cycle).

In FIG. 21(a), a numeral 80 (80a, 80b) represents communication frames transmitted from NC apparatus to driving amplifiers, and 81 (81a–81g) communication frames transmitted from a driving amplifier to NC apparatus. Communications between NC apparatus and driving amplifiers use a bidirectional full-duplex communication system via a pair of data transmission cables 70 and a pair of data transmission cables 71, as shown in FIG. 19.

In the communications from NC apparatus to driving amplifiers using the data transmission cable 70, the NC apparatus 61 as a master station transmits an arbitrary number of communication frames 80 to destination driving amplifiers in an arbitrary time during a communication cycle. A driving amplifier as a slave station constantly supervises the communication frames 80 transmitted from the NC apparatus 61 via the receiving controller 78 shown in FIG. 20 and receives the communication frames destined for the driving amplifier.

In the communications from a driving amplifier to NC apparatus using the data transmission cable 71, any one of a plurality of driving amplifiers may serve as a master station. Thus, the communication cycle undergoes time-division via a plurality of driving amplifiers and shared by the driving amplifiers and a driving amplifier as a master station transmits communication frames 81 (81a–81g) in a split communication time assigned. The NC apparatus 61 as a slave station receives the communication frames 81 transmitted from the other master stations on a per split communication time basis.

In FIG. 21(b), a numeral 82 (82a–82e) represents communication frames transmitted from the NC apparatus 61 to the remote I/O units 64, and 83 (83a–83e) communication frames transmitted from the remote I/O units 64 to the NC apparatus 61. As shown in FIG. 19, communications between NC apparatus and remote I/O units use a half-duplex communications system where the data transmission cable 75 for communications between NC apparatus and remote I/O units is shared by the NC apparatus 61 as a master station and a plurality of remote I/O units 64 and data is transmitted based on time division of a communication cycle.

One of the NC apparatus 61 and a plurality of remote I/O units 64 acts as a mater station and transmits communication frames 82 or communication frame 83. Devices other than the master station supervise the transmitted communication frames 82 as slave stations and receive communication frames 82 destined therefor.

In the aforementioned FIG. 21(a) and FIG. 21(b), in communications from a driving amplifier or remote I/O unit to NC apparatus, any one of a plurality of driving amplifiers and remote I/O units may serve as a master station. Thus, in order to perform time-division-based communications from a remote I/O unit to NC apparatus, communication time must be assigned so that the remote I/O units will not use time-division-based communication time in a overlapped fashion. Assignment of a station addresses and communication times is made by specifying ID numbers by using the ID setup switches 66.

FIG. 22 shows a configuration of a communication frame as a related art example. In case a plurality of slave stations exist, slave stations each is given its own station address. The master station specifies a specific slave station to perform communications with the slave station alone. In the figure, a numeral 84 represents a start flag, 85 a station address, 86 data, 87 a CRC (cyclic redundancy check), and 88 an end flag. The slave station supervises the station address 85 in the transmitted communication frame. The slave station receives the communication frame in case the station address has matched the pre-allocated station address or the station address specifies all the slave stations.

As mentioned earlier, in a related art NC system, communications between NC apparatus and driving amplifiers use a communications method including a communication cycle different from that communications between NC apparatus and remote I/O units, as shown in FIGS. 21(a) and 21(b). Thus the driving amplifiers and remote I/O units are connected to the NC apparatus via separate transmission lines as shown in FIG. 19. This leads to a problem of increased number of cables and more complicated wiring.

FIG. 23 shows communications (one communication cycle) as a related art example. By executing time-division of a communication cycle using a plurality of peripheral devices composed of driving amplifiers and remote I/O units, communications are performed while driving amplifiers and remote I/O units having different communication cycles are connected to the same transmission line. This configuration uses a single communication line, unlike a plurality of separate communication lines used as communication cables for driving amplifiers and communication cables for remote I/O units.

FIG. 23 shows the use state of the communication time of communication frames used in communications from NC apparatus to peripheral devices (servo amplifiers, spindle amplifiers, remote I/O units) and communications from peripheral devices to NC apparatus. In the figure, a numeral 89 (89a–89f) represents communication frames from NC apparatus to peripheral devices, 90 (90a–90f) communication frames from peripheral devices to NC apparatus. In communications from numerical control to peripherals devices, numerical control may serve as a master station. As shown in the figure, communication frames 89 are output by NC apparatus as a master station at an arbitrary time within the communication cycles.

In communications from peripherals devices to numerical control, any one of a plurality of peripheral devices may serve as a master station. Thus, the communication cycle undergoes time division and split communication times are assigned to peripheral devices without overlapping. A peripheral device acts as a master station only in the assigned time and communicates to NC apparatus as a slave station. As shown in the figure, communication frames 90 destined for NC apparatus are output from the peripheral device as a master station in the time assigned to the master station.

As mentioned earlier, it is possible to perform communications by connecting peripheral devices having different communication cycles to the same transmission line. In case time division is made in the peripheral device acting as a master station, it is necessary to perform communications in the shortest communication cycle. Thus the communication time is also assigned to devices that do not require a short communication cycle thereby worsening the communication efficiency.

In a related art NC system, as sow in FIG. 19, communications between NC apparatus and driving amplifiers use two pairs of data transmission cables for reporting an emergency stop signal that is not used in ordinary communications, on top of two pairs of data transmission cables for data communications. This leads to higher costs with respect to features and use frequency. These cables also complicates the wiring.

An approach is envisaged that two pairs of data transmission cables for reporting an emergency stop signal are omitted by providing a communication frame dedicated to an emergency stop signal and communicating an emergency stop signal in a communication cycle by using two pairs of data transmission cables for data communications. However, in case an emergency stop signal is transmitted in a dedicated communication frame, it is necessary to assign a time to accommodate a communication frame dedicated to an emergency stop signal in a communication cycle, thus requiring sufficient time. Further, in order to assure real-time conveyance of emergency stop information, it is necessary to insert a plurality of communication frames dedicated to an emergency stop signal in a communication cycle. When sufficient time is not available to follow such a procedure, quick conveyance of emergency stop information is disabled.

In case a communication frame dedicated to an emergency stop signal is not provided but emergency stop information is appended in a communication frame for transmission used in ordinary communications, it is necessary to check for emergency stop information on a per communication frame basis in order to detect emergency stop information in real time. This leads to a longer wait time in CPU processing caused by data retrieval from all the communication frames transmitted, thereby degrading the CPU performance.

An approach is envisaged that optical transmission module supporting high-speed data transmission are used in order to assure real-time conveyance of emergency stop information.

However, in case data transmission is performed via serial connection using optical transmission modules as a plurality of driving amplifiers composed of servo amplifiers and spindle amplifiers, high-speed data transmission is effected via a lightwave signal in a fiber-optic cable but transmission delay is generated in a driving amplifier, because it is necessary to convert a received lightwave signal to an electric signal, extract a data component and a clock component from the electric signal, store the components in a buffer, then transmit the components in synchronization with a transmit clock. This transmission delay accumulates as often as the number of connected driving amplifiers so that a time lag occurs in a synchronization signal receiving time depending on the location of connection (in which ordinal rank from the NC apparatus the target driving amplifier is connected) even when a synchronization signal is transmitted from NC apparatus to a driving amplifier on a per communication cycle basis. This causes dislocation of the synchronization timing between driving amplifiers even if the driving amplifier performs synchronization at the moment it has received a synchronization signal.

FIG. 24 shows the operation of a communication control buffer in communications using optical transmission modules as a related art example. In the figure, a numeral 91 represents a communication control buffer composed of a 32-bit FIFO (first-in, first-out), 92 a write pointer, and 93 a read pointer.

The write pointer 92 writes 1-bit receive data in synchronization with the clock component of the receive data and shifts the pointer by one bit. The read pointer 93 reads 1-bit data from the communication control buffer in synchronization with the clock component of the transmit data and shifts the pointer by one bit. Moving speed of the write pointer 92 does not match the moving speed of the read pointer 93. In case the transmit clock component is faster than the receive clock component, the read pointer 93 passes the write pointer 92 thus causing the bit pattern of a flag to be generated inadvertently. In order to prevent the bit pattern of a flag from being generated inadvertently while processing effective data, the number of data pieces in one-round transmit frame is limited so as to prevent the pointer passing phenomenon and the write pointer 92 is placed 16 bits apart from the read pointer 93 each time the flag of a frame is received.

In the aforementioned optical transmission module supporting high-speed transmission, restriction on the structure of bits in data is provided, such as "The number of successive 1s or 0s in transmission data shall be seven or below," and "The incidence of 1 and 0 in transmission data is 50 percent," in order to normally extract the data component and the clock component of receive data. In general a flag is appended at each of the head and tail of a transmit frame. When a bit structure such as "01111110" is selected for a bit pattern as a flag and the bit pattern is transmitted more than once, the incidence of "1" is excessively higher than that of "0" thus considerably degrading the communication performance in the optical transmission module thus preventing successful extraction of data component and clock component.

The method to set ID numbers using switches and to specify station addresses and communication times (transmit timing) for time-division-based communications leads to higher costs due to increased number of parts including switches, cumbersome setting work, increased set time, and human setting errors.

Communications in a related art NC system has a transmission controller and a receiving controller used as a pair. In this configuration, data communications between driving amplifiers are disabled, for example, data transmitted by the servo amplifier 62a to the NC apparatus 61 cannot be received by the servo amplifier 62b or the spindle amplifier 63b. Thus, data must be communicated by way of NC apparatus and high-speed inter-shaft correction is disabled.

The invention has been proposed to solve the foregoing problems. The first object of the invention is to provide a numerical control system that allows efficient communications wherein numerical control apparatus and peripheral devices composed of at least one of a servo amplifier, a spindle amplifier and a remote I/O unit are serially connected by using a communication cable composed of a data transmission cable for transmission and a data transmission cable for reception in order to perform time-division-based communications between the numerical control apparatus and the peripheral devices.

The second object of the invention is to provide a numerical control system that can transmit information related to emergency stop such as an alarm, gating off, and emergency stop in real time without using two pairs of twisted-pair cables dedicated to reporting of an emergency stop signal.

The third object of the invention is to provide a numerical control system that can set station addresses and communication times (transmit timing) for time-division-based communications without setting ID numbers via switch operation.

Another object of the invention is to provide a numerical control system that can perform synchronous control of a plurality of peripheral devices.

Another object of the invention is to provide a numerical control system that can communicate between peripheral devices.

Another object of the invention is to provide a numerical control system that can transmit information related to emergency stop such as an alarm, gating off, and emergency stop to devices connected upstream (hereinafter referred to as upstream nodes) as well as devices connected downstream (hereinafter referred to as downstream nodes).

Another object of the invention is to provide a numerical control system wherein, during data transmission using optical transmission modules, even in case the write pointer is out of synchronization with the read pointer in the communication control buffer or in case the communication control buffer is reset, a bit pattern obtained after the read pointer has moved is not a specific bit pattern serving as a flag.

Another object of the invention is to provide a numerical control system that maintains communication performance by bring the number of 1s and the number of 0s in balance for a start flag that is frequently used.

DISCLOSURE OF THE INVENTION

A numerical control system of the invention is a system wherein numerical control apparatus and peripheral devices composed of at least one of a servo amplifier, a spindle amplifier and a remote I/O unit are serially connected by using a communication cable composed of a data transmission cable for transmission and a data transmission cable for reception in order to perform time-division-based communications between said numerical control apparatus and said peripheral devices, characterized in that a communication cycle in communications between said numerical control apparatus and said peripheral devices is split into a plurality of sub cycles in order to process data to be processed in said communication cycle in said split plurality of sub cycles.

A numerical control system of the invention is a system characterized in that an emergency stop information section is provided in a communication frame used in communications between said numerical control apparatus and said peripheral devices in order to provide an emergency stop information section in each piece of data split into said plurality of sub cycles.

A numerical control system of the invention is a system characterized in that a receiving controller in each of said numerical control apparatus and said peripheral devices checks the emergency stop information section in the received communication frame irrespective of the station address specified in the transmitted communication frame in case a receiving error has not occurred.

A numerical control system of the invention is a system characterized in that a gating off system information section for specifying a system to be gated off in said communication frame, that said numerical control apparatus specifies a system to be gated off in said gating off system information section before transmitting the frame to said peripheral device in case gating off is to be instructed, and that said peripheral device performs gates off said peripheral device on a per gating off system specified, by performing gating off when the system that belongs to the gating off system information section of a received communication frame is specified as a gating off system.

A method for setting a communication timing in the numerical control system of the invention is a method wherein numerical control apparatus and peripheral devices composed of at least one of a servo amplifier, a spindle amplifier and a remote I/O unit are serially connected by using a communication cable composed of a data transmission cable for transmission and a data transmission cable for reception in order to perform time-division-based communications between said numerical control apparatus and said peripheral devices, wherein said numerical control apparatus follows a step of transmitting a port connection confirmation command to said peripheral device in initial communications, a step of recognizing the connection state of said peripheral devices and calculating the number of said peripheral devices connected and the transmission timing of each of said peripheral devices from the number of model codes and the order of model codes appended to a port information command in case a response to a port connection confirmation command and a port information command are received from said peripheral device, and a step of transmitting said calculated number of connections and transmission timing to said peripheral device as a node count notice command and a communication timing setup command, and wherein said peripheral device follows, on receiving said port connection confirmation command, a step of transmitting said response to a port connection confirmation command to upstream nodes as well as transmitting said port connection confirmation command to downstream nodes, a step of appending a model code allocated to said port information command in advance and transmitting the resulting command to upstream nodes, and a step of retaining said number of connections and transmission timing specified in said node count notice command and communication timing setup command in case said node count notice command and communication timing setup command are received, characterized in that the communication timing of said peripheral device is automatically set via initial communications between said numerical control apparatus and said peripheral devices.

A numerical control system of the invention is a system characterized in that said peripheral device, on receiving a synchronization frame transmitted from said numerical control apparatus in initial communications, outputs a synchronization signal and calculates the time required for said peripheral device as the most downstream node to receive said synchronization frame.

A numerical control system of the invention is a system characterized in that said peripheral device calculates a transmission timing that considers a transmission delay between peripheral devices based on the connection information transmitted from said numerical control apparatus in initial communications.

A numerical control system of the invention is a system wherein said numerical control apparatus and said peripheral device each has a transmission controller for Port 1, a receiving controller for Port 1, a transmission controller for Port 2, and a receiving controller for Port 2, characterized in that said numerical control apparatus recognizes the connection state of said peripheral devices, calculates the number of said peripheral device nodes and the transmission timing of each of said peripheral devices, calculates the transmission timing in communications between said peripheral devices from the data volume of communication frames transmitted to said peripheral devices and the data volume of communication frames transmitted by said peripheral devices in communications between peripheral devices, and transmits the transmission timing to said peripheral devices, and that said peripheral device retains the node count and transmission timing transmitted from said numerical control apparatus in initial communications as well as the transmission timing in communications between peripheral devices in order to perform communications between peripheral devices by using the transmission timing in the communications between peripheral devices.

A numerical control system of the invention is a system wherein said numerical control apparatus and said peripheral device each has a transmission controller for Port 1, a receiving controller for Port 1, a transmission controller for Port 2, and a receiving controller for Port 2, characterized in that said numerical control apparatus, on occurrence of an alarm, transmits alarm information to devices connected upstream of said transmission controller for Port 1 as well as nodes downstream of said transmission controller for Port 2.

A numerical control system of the invention is a system characterized in that information such as an alarm, gating off, and emergency stop included in a communication frame received by Port 1 receiving controller or Port 2 receiving controller is latched and the information is appended to a communication frame to be transmitted from a Port 2 transmission controller or Port 1 transmission controller.

A numerical control system of the invention is a system characterized in that, in case the write pointer is out of synchronization with the read pointer in the communication control buffer or in case the communication control buffer is reset, a first bit pattern output after the read pointer has moved is not a specific bit pattern serving as a flag.

A numerical control system of the invention is a system characterized in that dummy data is created for balancing the bit pattern of a start flag and the bit count in data transmission using optical transmission modules so as to transmit the dummy data in combination with the start flag.

BRIEF DESCRIPTION OF THE DRAWINGS

FIGS. 7(a) 7(b) 7(c) 7(d) 7(e) shows a command used in initial communications in an NC system according to Embodiment 3 of the invention.

FIG. 21 shows communications in the NC system (one communication cycle) as a related art example.

BEST MODE FOR CARRYING OUT THE INVENTION

Embodiment 1

Figure 1:
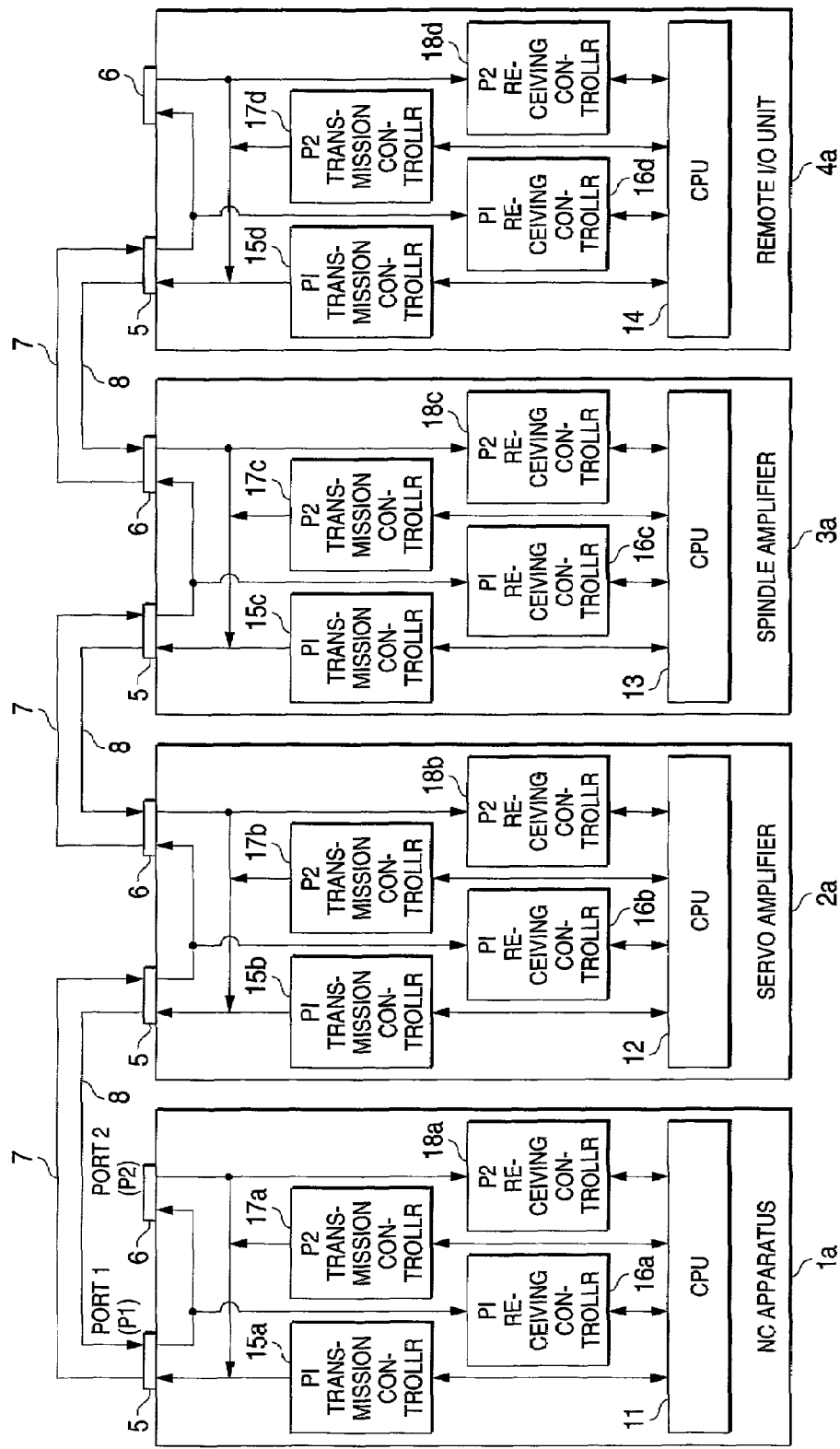
FIG. 1 shows a configuration of an NC system according to Embodiment 1 of the invention.

FIG. 1 shows a configuration of an NC system according to Embodiment 1 of the invention, where communications are performed with driving amplifiers (servo amplifiers, spindle amplifier) and remote I/O units connected to the same transmission line. In the figure, a numeral 1*a* represents NC apparatus, 2*a* a servo amplifier, 3*a* a spindle amplifier, 4*a* a remote I/O unit, 5 Port 1, 6 Port 2, 7 a communication cable for transmission, 8 a communication cable for reception, 11 a CPU for controlling the NC apparatus 1*a*, 12 a CPU for controlling the servo amplifier 2*a*, 13 a CPU for controlling the spindle amplifier 3*a*, 14 a CPU for controlling the remote I/O unit 4*a*, 15 (15*a*, 15*b*, 15*c*, 15*d*) transmission controllers for Port 1 (P1), 16 (16*a*, 16*b*, 16*c*, 16*d*) receiving controllers for Port 1 (P1), 17 (17*a*, 17*b*, 17*c*, 17*d*) transmission controllers for Port 2 (P2), and 18 (18*a*, 18*b*, 18*c*, 18*d*) receiving controllers for Port 2 (P2).

An NC system shown in FIG. 1 comprises the NC apparatus 1*a* and peripheral devices composed of the servo amplifier 2*a*, the spindle amplifier 3*a* and the remote I/O unit 4*a*, said NC apparatus and said peripheral devices serially connected using a single common communication line composed of the communication cable for transmission 7 and a communication cable for reception 8.

Figure 2:
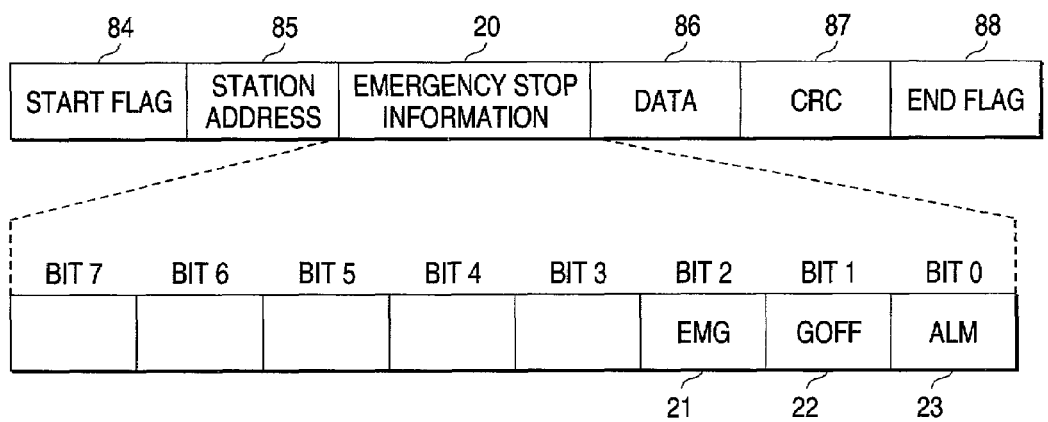
FIG. 2 shows a structure of a communication frame used in communications between NC systems according to Embodiment 1 of the invention.
Figure 22:
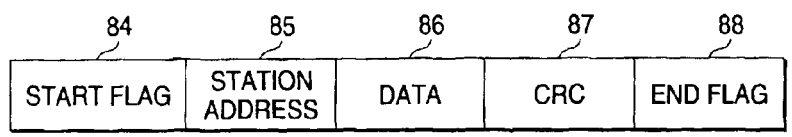
FIG. 22 shows a configuration of a communication frame as a related art example.
Figure 23:
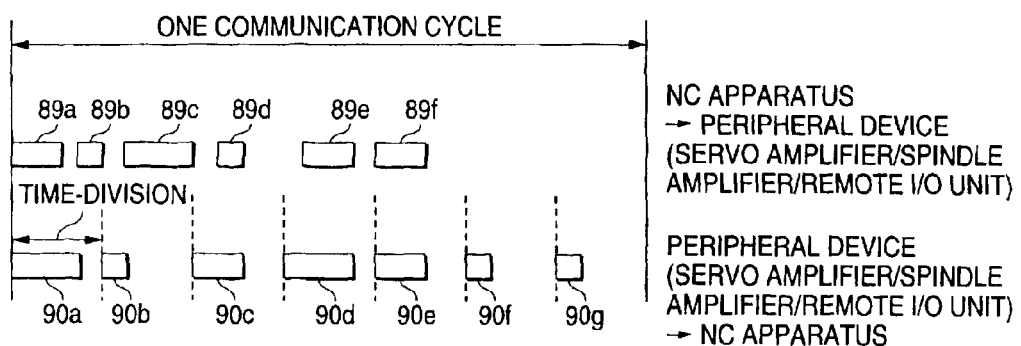
FIG. 23 shows communications in the NC system (one communication cycle) as a related art example.
Figure 24:
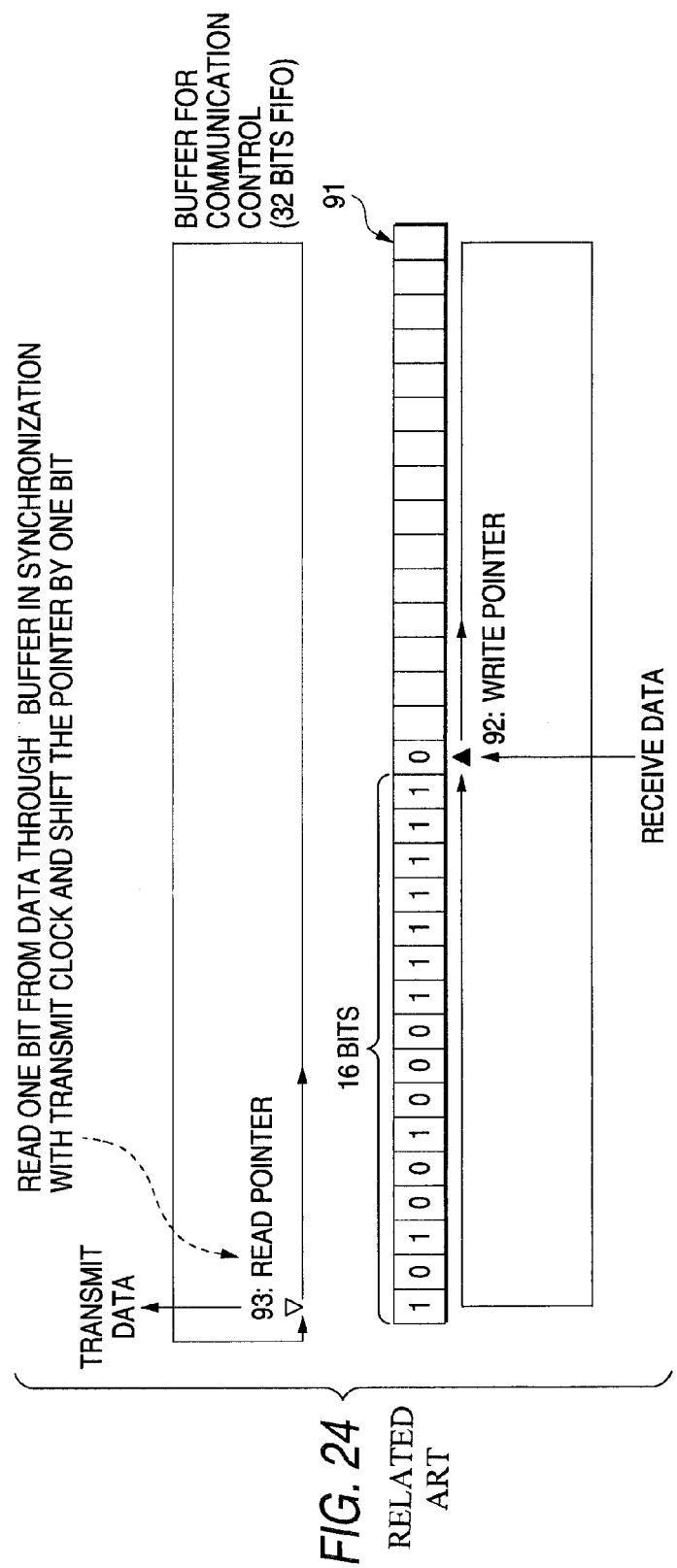
FIG. 24 shows the operation of a communication control buffer in communications using optical transmission modules as a related art example.

FIG. 2 shows a structure of a communication frame used in communications between NC systems according to Embodiment 1 of the invention, where an emergency stop information section is provided in a communication frame in order to convey an emergency stop signal over an ordinary transmission path. In the figure, numerals 84 through 88 are same as those in FIG. 22 as a related art example and corresponding description is omitted. A numeral 20 represents an emergency stop information section, 21 EMG as emergency stop information, 22 GOFF as gating off information for gating off via emergency stop or servo off event, and 23 ALM as alarm information. The emergency stop information section 20 includes information of EMG 21, GOFF 22 and ALM 23.

Figure 3:
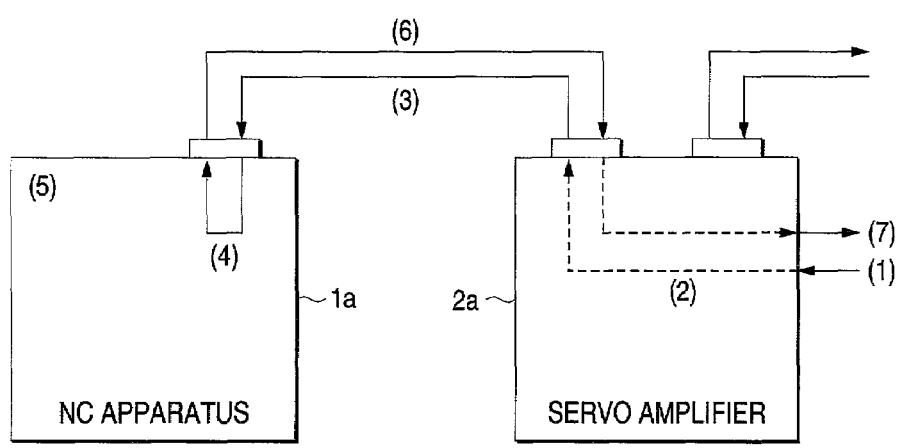
FIG. 3 shows a flow of emergency stop information in an NC system according to Embodiment 1 of the invention.

FIG. 3 shows a flow of emergency stop information in an NC system according to Embodiment 1 of the invention.

When an alarm ALM is input (1) to the servo amplifier 2*a*, the servo amplifier 2*a* executes alarm processing as well as appends an ALM bit to bit 0 of the emergency stop information section 20 of a communication frame, then transmits (2) the frame to the NC apparatus 1*a*. The NC apparatus 1*a*, in case an ALM bit is appended to the emergency stop information section 20 of a received communication frame, appends (4) an EMG bit to bit 2 of the emergency stop information section 20 of a communication frame to be transmitted (6) and (7), in order to notify "occurrence of EMG." The servo amplifier 2*a* connected to the NC apparatus 1*a*, in case an EMG bit is appended to the emergency stop information section 20 of a received communication frame, performs emergency stop processing. While an example of numerical control and servo amplifiers is shown in the figure, spindle amplifiers or remote I/O units may be used instead of servo amplifiers.

Transmission controllers for Port 1 (P1) 15, receiving controllers for Port 1 (P1) 16, transmission controllers for Port 2 (P2) 17, and receiving controllers for Port 2 (P2) 18 of NC apparatus, driving amplifiers and remote I/O units, in case a receiving error is not detected (CRC check OK), checks the ALM/GOFF/EMG bit present in the emergency stop information section 20 in the received communication frame and respectively perform emergency stop processing in the case of "occurrence of EMG."

The ALM/GOFF/EMG bit in the received communication frame is checked only when a receiving error is not detected, so that it is possible to convey emergency stop information without performing unnecessary data extraction/buffering thus enhancing the real-time conveyance of emergency stop information.

Figure 4:
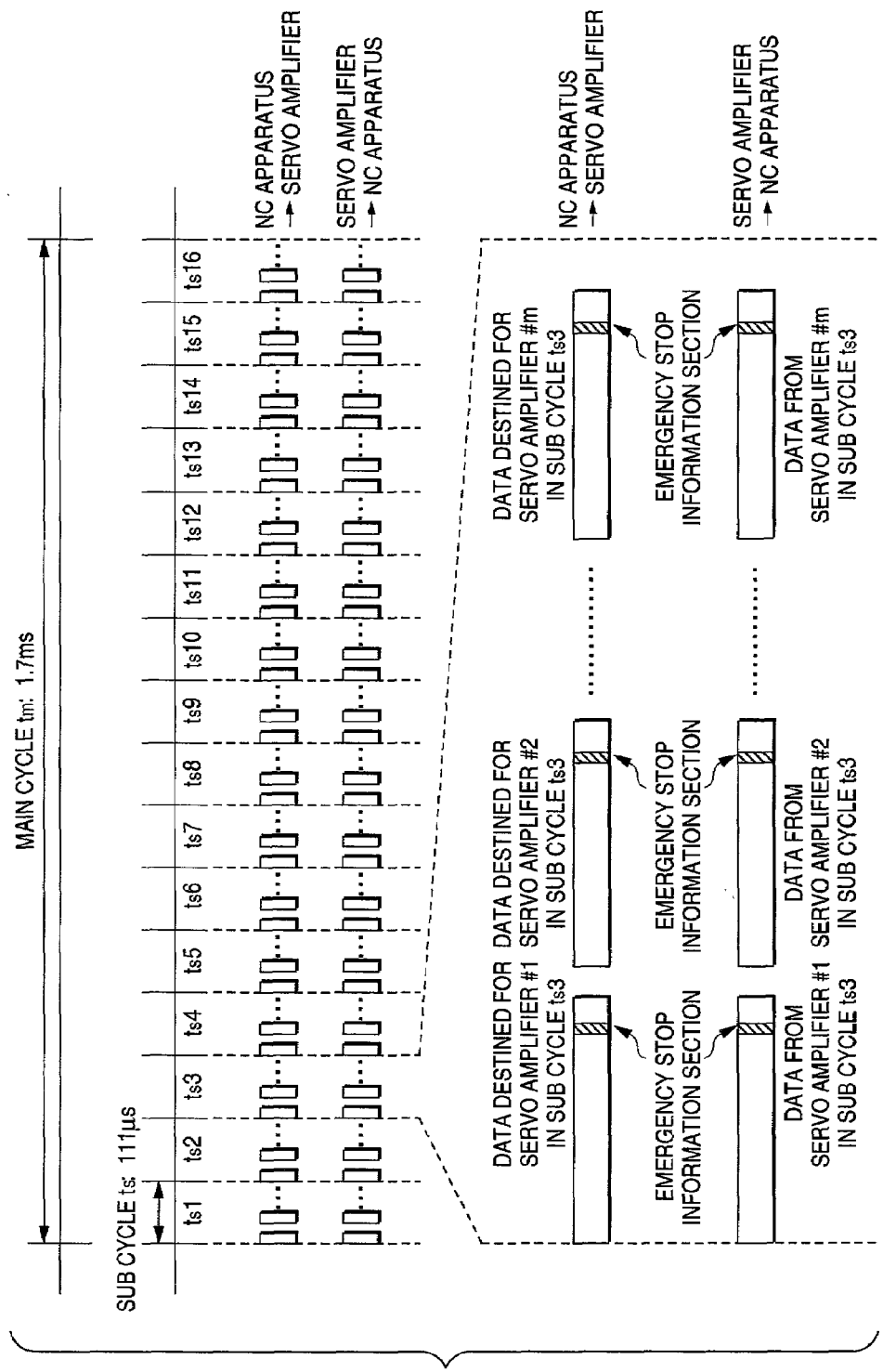
FIG. 4 shows communications between NC systems according to Embodiment 1 of the invention.

FIG. 4 shows communications between NC systems according to Embodiment 1 of the invention, where the sub cycle ts (111 μs) obtained by splitting the main cycle tm (1.7 ms) into 16 pieces is used to transmit data. Data transmitted in the main cycle tm is split into 16 pieces of data, which are transmitted in sub cycle ts1 through ts16. An emergency stop information section is included in each of the 16 data pieces. While an example of numerical control and servo amplifiers is shown in the figure, spindle amplifiers or remote I/O units may be used instead of servo amplifiers.

While a driving amplifier (servo amplifier, spindle amplifier) transmits data to the NC apparatus once in a main cycle in the related art apparatus so that notice is made only once per servo synchronization cycle, data is split into 16 pieces and each data piece is transmitted once in a sub cycle (emergency stop information is also transmitted in this practice) in Embodiment 1. This assures real-time conveyance of emergency stop information.

While a main cycle of 1.7 ms and a sub cycle of 111 μs obtained by splitting the main cycle into 16 pieces are shown in the foregoing example, the main cycle and the sub cycle are determined according to the configuration of the NC system, required accuracy and required specifications and thus are not limited to these values.

While a servo amplifier transmits data once in a sub cycle in the foregoing example, the servo amplifier may transmit data a plurality of times in a sub cycle in order to provide more frequent conveyance of emergency stop information and to enhance real-time conveyance of emergency stop information.

Embodiment 2

Figure 5:
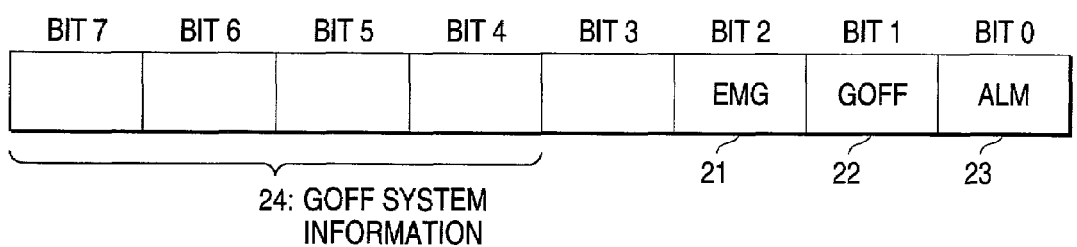
FIG. 5 shows a structure of a communication frame used in communications between NC systems according to Embodiment 2 of the invention.

FIG. 5 shows a structure of a communication frame used in communications between NC systems according to Embodiment 2 of the invention. In the figure, numerals 21 through 23 are same as those in FIG. 2 shown in Embodiment 1 and corresponding description is omitted. A numeral 24 represents GOFF system information for specifying a system to be gated off allocated to bit 4 through bit 7 of the emergency stop information section 20.

Figure 6:
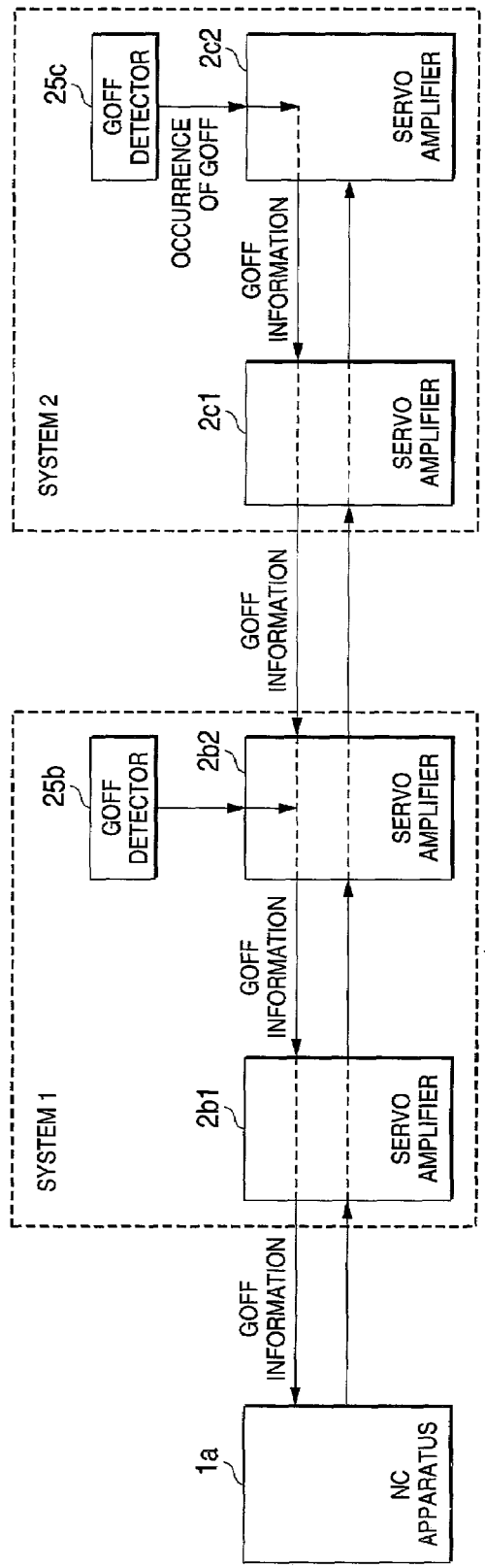
FIG. 6 shows a connection between NC apparatus and servo amplifiers according to Embodiment 2 of the invention.

FIG. 6 shows a connection between NC apparatus and servo amplifiers according to Embodiment 2 of the invention. This is an example of an NC system where peripheral devices connected to NC apparatus are classified into two systems, System 1 and System 2 for separate control. In the figure, a numeral 1a represents NC apparatus, numerals 2b1, 2b2 servo amplifiers constituting System 1, 2c1, 2c2 servo amplifiers constituting System 2, and 25b a GOFF detector connected to System 2. While an example of numerical control and servo amplifiers is shown in the figure, spindle amplifiers or remote I/O units may be used instead of servo amplifiers.

The GOFF detector 25c that constitutes System 2 transmits occurrence of GOFF to the servo amplifier 2c2 when gating off has occurred. The servo amplifier that constitutes System 2, receiving occurrence of GOFF from the GOFF detector 25c, sets GOFF bit to bit 1 of the emergency stop information section 20 of a communication frame to be transmitted to the NC apparatus and occurrence of GOFF of System 2 to GOFF system information 24 in bit 4 through bit 7, while executing gating off processing. The servo amplifier 2c1 that constitutes System 2 checks the occurrence of GOFF in bit 1 and instruction of System 2 in the GOFF system information 24 in bit 4 through bit 7, then the servo amplifier 2c1 and the servo amplifier 2c2 execute gating off processing. The servo amplifier 2b1 and the servo amplifier 2b2 that constitute System 1 together with the GOFF detector 25b, checking the occurrence of GOFF in bit 1 of the emergency stop information section 20 and instruction of System 2 in the GOFF system information in bit 4 through bit 7, continues processing without executing gating off processing.

Embodiment 2 provides the emergency stop information section 20 of a transmission frame with GOFF information in order to specify a system to be gated off. In this embodiment, control systems are allocated to peripheral devices such as servo amplifiers, spindle amplifiers and remote I/O units and a peripheral device executes gating off processing only when bit 1 of the emergency stop information section 20 of a received transmit frame is "occurrence of GOFF" and a system to be gated off is specified in the GOO system information in bit 4 through bit 7 matches the allocated control system.

As mentioned earlier, peripheral devices connected to numerical control can be controlled by splitting the devices into a plurality of systems as candidates for simultaneous gating off. It is thus possible to gate off only a system that needs gating off, without gating off the entire NC system, that is, the other system(s) that requires no gating off can continue operation, thereby assuring effective operation of the NC system.

Embodiment 3

FIG. 7 shows a command used in initial communications in an NC system according to Embodiment 3 of the invention. In the figure, a numeral 30 represents a port connection confirmation command, 31 a response to a port connection confirmation command, 32a a port information command, 32b an I/O code appended by a remote I/O unit, 32c a servo code appended by a servo amplifier, 32d a spindle code appended by a spindle amplifier, 33a a node count notice command having node count data 33b representing the number of connected devices (hereinafter referred to as the node count) and station address data 33c, 34a a communication timing setup command having data 34b representing a reception timing, data 34c representing a transmission timing of a remote I/O unit, data 34d representing a transmission timing of a servo amplifier, and data 34e representing a transmission timing of a spindle amplifier.

Figure 8:
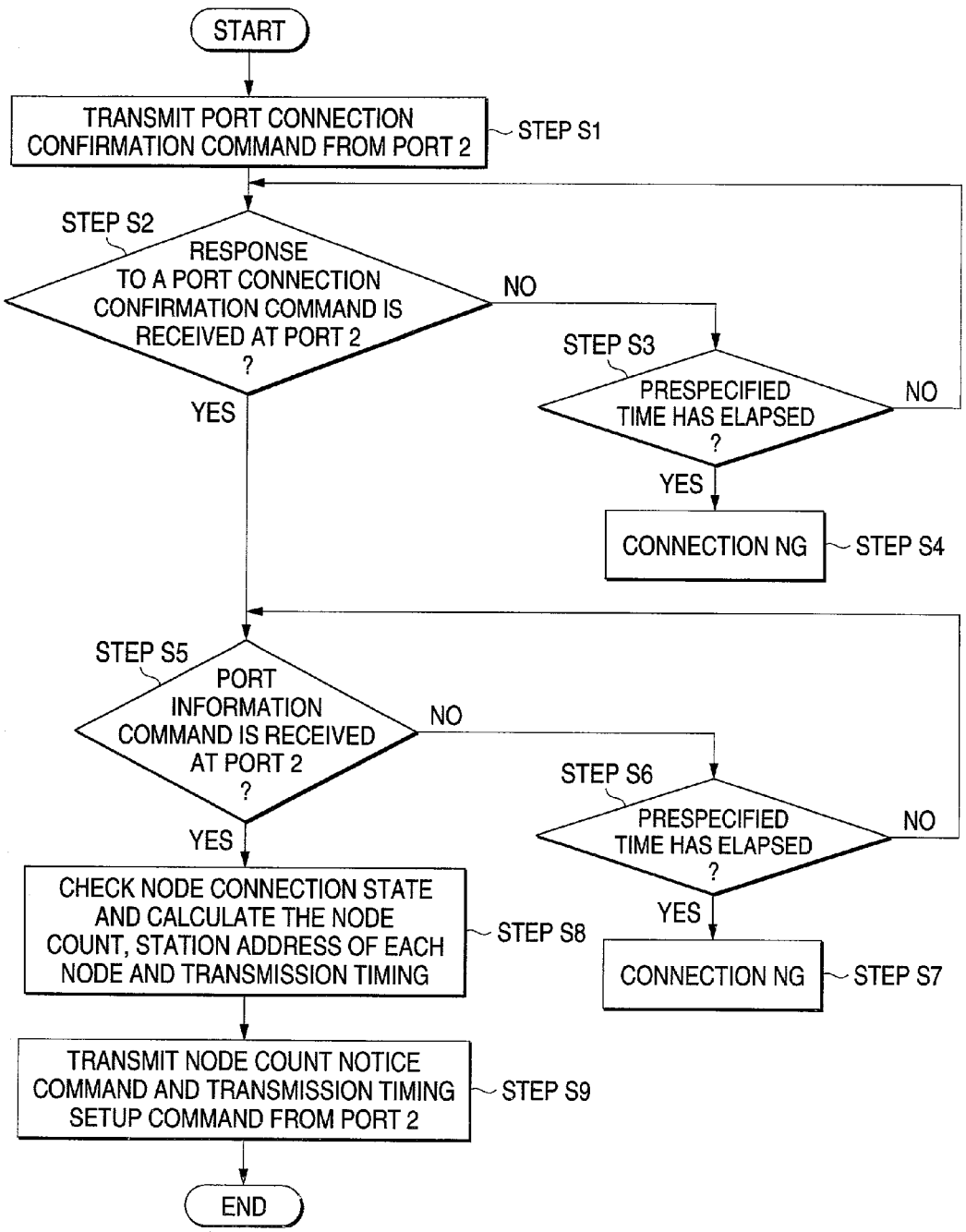
FIG. 8 is a flowchart in the initial communications on the NC apparatus in an NC system according to Embodiment 3 of the invention.

FIG. 8 is a flowchart in the initial communications on the NC apparatus in an NC system according to Embodiment 3 of the invention.

Figure 9:
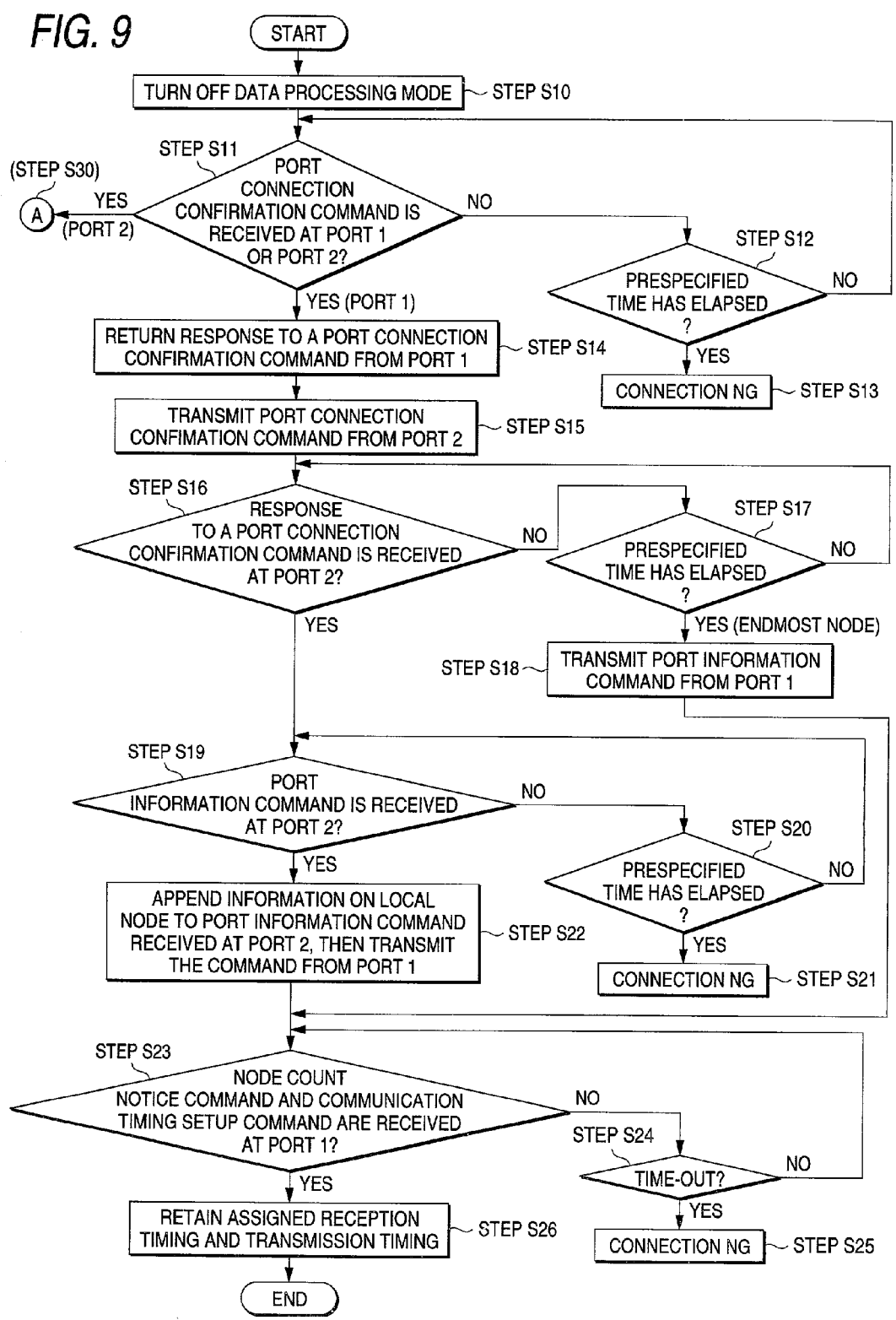
FIG. 9 is a flowchart in the initial communications on the peripheral devices (driving amplifiers such as servo amplifiers and spindle amplifiers and remote I/O units) in an NC system according to Embodiment 3 of the invention.
Figure 10:
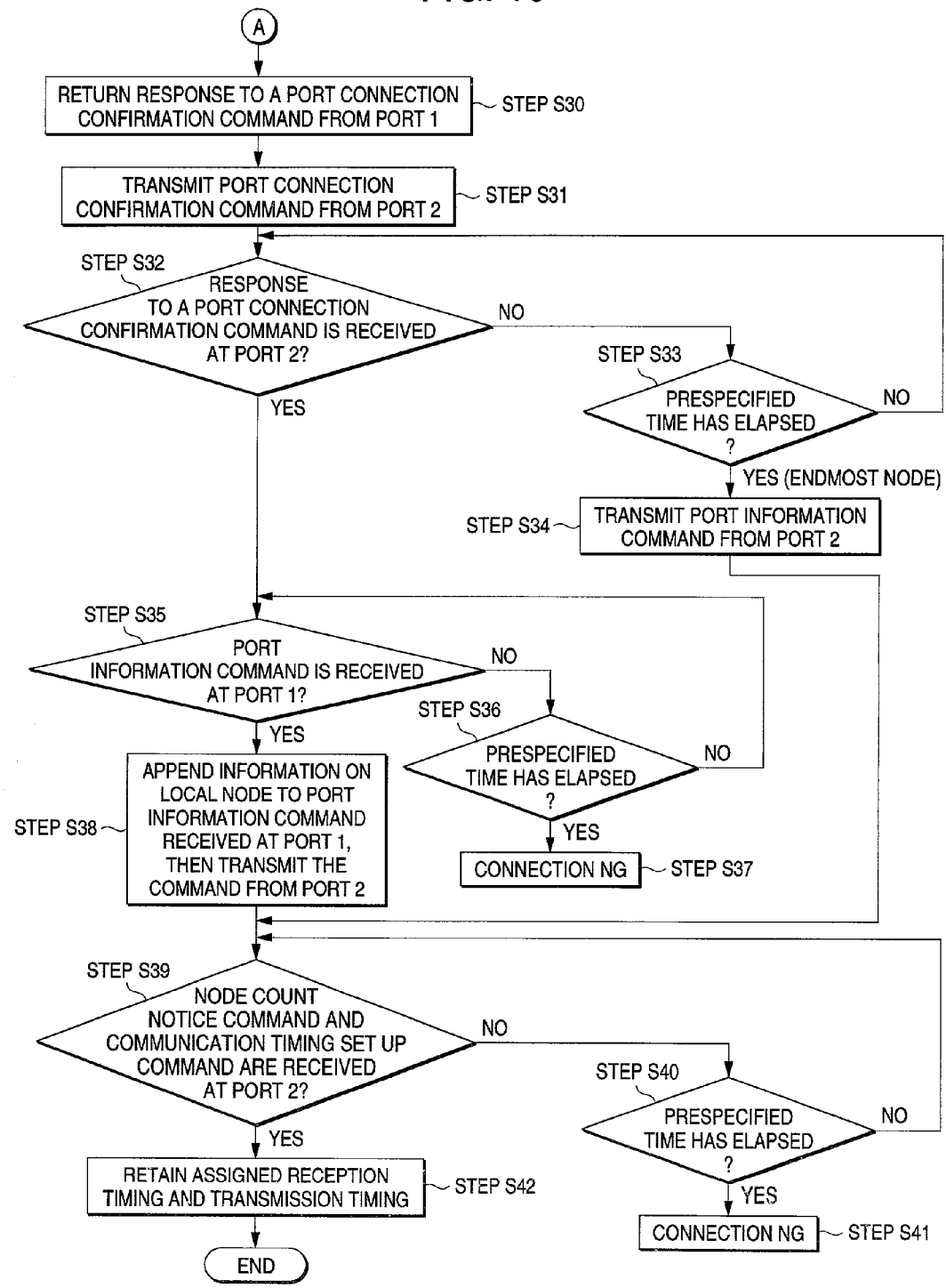
FIG. 10 is a flowchart in the initial communications on the peripheral devices (driving amplifiers such as servo amplifiers and spindle amplifiers and remote I/O units) in an NC system according to Embodiment 3 of the invention.

FIG. 9 and FIG. 10 are flowcharts in the initial communications on the peripheral devices (driving amplifiers such as servo amplifiers and spindle amplifiers and remote I/O units) in an NC system according to Embodiment 3 of the invention.

Referring to FIGS. 7 through 10, initial communications will be described in an NC system according to Embodiment 3 of the invention.

The NC apparatus transmits a port connection confirmation command 30 from Port 2 to a peripheral device in step S1 shown in FIG. 8. In step S2, the NC apparatus checks whether the response to a port connection confirmation command 31 has been received at Port 2 from the peripheral device. In case the response to a port connection confirmation command 31 has not been received, the NC apparatus checks whether a prespecified time has elapsed in step S3. In case the prespecified time has not elapsed, execution returns to step S2. In case the response to a port connection confirmation command 31 is not returned when the prespecified time has elapsed, the NC apparatus determines connection NG in step S4.

In case the NC apparatus has received the response to a port connection confirmation command 31, the NC apparatus checks whether a port information command 32 has been received at Port 2 from the peripheral device in step S5. In case the port information command 32 has not been received, the NC apparatus checks whether the prespecified time has elapsed in step S6. In case the prespecified time has not elapsed, execution returns to step S5. In case the port information command 32 is not returned when the prespecified time has elapsed, the NC apparatus determines connection NG in step S7.

In case the NC apparatus has received the port information command 32, the NC apparatus recognizes the connection state of peripheral devices connected to the NC apparatus such as servo amplifiers, spindle amplifiers and remote I/O units from the I/O code, servo code, spindle code written in the port information command and the order of writing, then calculates the node count, station address and transmission timing in step S8. In step S9, the NC apparatus transmits a node count notice command 33*a* and a communication timing setup command 34*a* from Port 2.

A peripheral device turns OFF the data processing mode in step S10 shown in FIG. 9. In step S11, the peripheral device checks whether a port connection command 30 has been received at Port 1 or Port 2. In case the port connection confirmation command 30 has not been received, the peripheral device checks whether a prespecified time has elapsed in step S12. In case the prespecified time has not elapsed, execution returns to step 11. In case the port connection confirmation command 30 is not returned when the prespecified time has elapsed, the peripheral device determines no connection in step S13.

In case the peripheral device has received the port connection confirmation command 30, the peripheral device checks whether the port connection confirmation command has been received at Port 1 or Port 2. In case the port connection confirmation command 30 has been received at Port 2, execution proceeds to step S30 in FIG. 10. In case the port connection confirmation command 30 has been received at Port 1, execution proceeds to step S14.

In case the peripheral device has confirmed reception of the port connection confirmation command 30 at Port 1, the peripheral device promptly returns a response to a port connection confirmation command 31 from Port 1 to the NC apparatus as well as transmits the port connection confirmation command 30 from Port 2 to downstream nodes in step S15.

In step S16, the peripheral device has confirmed reception of the response to a port connection confirmation command 31 at Port 2. In case the response to a port connection confirmation command 31 has not been received, the peripheral device checks whether a prespecified time has elapsed in step S17. In case the prespecified time has not elapsed, execution returns to step S16. In case the response to a port connection confirmation command 31 is not received when the prespecified time has elapsed, the peripheral device transmits a port information command 32 from Port 1 in step S18. In case the response to a port connection confirmation command 31 is not received when the prespecified time has elapsed at Port 2 in steps S16 and S17, the peripheral device determines that no downstream nodes are connected to Port 2, that is, the peripheral device is the most downstream node.

In step S19, the peripheral device checks whether a port information command 32 has been received at Port 2. In case the port information command 32 has not been received, the peripheral device checks whether a prespecified time has elapsed in step S20. In case the prespecified time has not elapsed, execution returns to step S19. In case the port information command 32 is not returned when the prespecified time has elapsed, the peripheral device determines connection NG in step S21.

In case the port information command 32 is received at Port 2, the peripheral device appends a code to the tail of the received port information command 32 in step S22 and transmits the resulting command from Port 1. FIG. 7(*c*) shows a state of the received port information command 32*a* where an I/O code 32*b*, a servo code 32*c* and a spindle code 32*d* are appended in the order to the remote I/O unit, servo amplifier, and spindle amplifier.

In step S23, the peripheral device checks whether a node count notice command 33*a* and a communication timing setup command 34*a* have been received. In case the node count notice command 33*a* and the communication timing setup command 34*a* have not been received, the peripheral device checks whether a prespecified time has elapsed in step S24. In case the prespecified time has not elapsed, execution returns to step S23. In case the node count notice command 33*a* and the communication timing setup command 34*a* are not received when the prespecified time has elapsed, the peripheral device determines connection NG in step S25.

In case the peripheral device have received the node count notice command 33*a* and the communication timing setup command 34*a* in step S23, the peripheral device recognizes in which ordinal rank from the NC apparatus the peripheral device is connected and its own communication timing. The peripheral device then retains the assigned station address, reception timing and transmission timing in step S26.

While in the foregoing example NC apparatus calculates a station address in step S8 in FIG. 8 and transmits node count data 33*b* and station address data 33*c* as a node count notice command 33*a* to a peripheral device in step S9, the NC apparatus may transmit node count data 33*b* alone as a node count notice command 33*a* without calculating a station address and the peripheral device may calculate the station address based on the node count data 33*b*. In this case, it is necessary to transmit the calculated station address to the NC apparatus.

FIG. 10 shows the processing in a peripheral device performed in case reception of a port connection confirmation command 30 is confirmed at Port 2 in step S11 in FIG. 9. Steps S30 through S42 in FIG. 10 are the similar to steps S14 through S26 that branches in case reception of a port connection confirmation command 30 is confirmed at Port 1 in the step S11, although the role of Port 1 is opposite to that of Port 2.

In Embodiment 3, NC apparatus and peripheral devices that constitute an NC system shown in FIGS. 8 through 10 check the connection state of peripheral devices and set a station address and a transmission timing in a communication cycle in time-division-based communications in accordance with flowcharts shown in FIGS. 8 through 10. This prevents a setting error in setting IDs and omits cumbersome work and ID setup switches.

Embodiment 4

Figure 11:
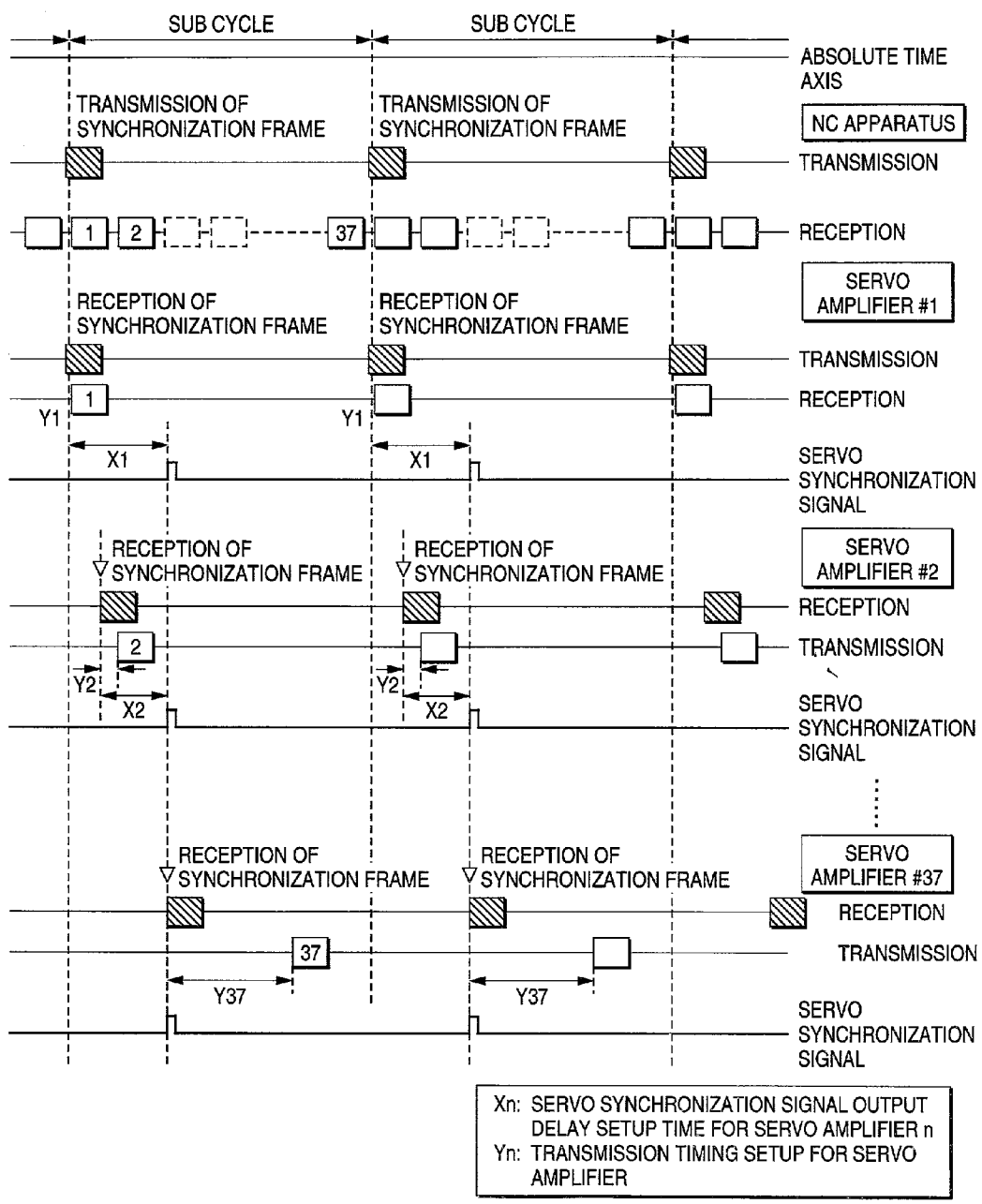
FIG. 11 shows the state of data transmission by an optical transmission module in an NC system according to Embodiment 4 of the invention.

FIG. 11 shows the state of data transmission by an optical transmission module in an NC system according to Embodiment 4 of the invention. In the figure, a numeral (X1, X2) represents a servo synchronization signal output delay time from reception of a servo synchronization frame by a servo amplifier (#1, #2) to output of a servo synchronization signal, Y (Y1, Y2, ..., Y37) a transmission timing for a servo amplifier (#1, #2, ..., #37) to transmit reception of a servo synchronization frame after receiving a servo synchronization frame. While an example of numerical control and servo amplifiers is shown in the figure, spindle amplifiers or remote I/O units may be used instead of servo amplifiers.

In case synchronous control is made, a servo amplifier uses a synchronization signal to start synchronous control processing. In a serial connection using optical transmission modules, the time from reception of a servo synchronization frame by NC apparatus to reception of a servo synchronization frame by a servo amplifier is subject to a delay caused by data processing. That is, a time lag occurs in the synchronization signal receiving time depending on in which ordinal rank from the NC apparatus the servo amplifier is connected.

A receiving controller of a servo amplifier according to Embodiment 4 calculates the servo synchronization signal output delay time X (X1, X2 . . . .) as a time required until the servo amplifier #37 connected most downstream receives a servo synchronization frame after a servo synchronization frame is received from the NC apparatus acting as a host in initial communications. After that, the receiving controller, receiving a servo synchronization frame, outputs a servo synchronization signal with a delay of the servo synchronization signal output delay time X. A transmission controller of a servo amplifier according to Embodiment 4 determines in which ordinal rank the servo amplifier is connected based on the connection information on peripheral devices, and calculates the transmission timing Y (Y1, Y2, . . . , Y37). After that, the transmission controller, receiving a servo synchronization frame, transmits reception of a servo synchronization frame with a delay of the transmission timing Y.

In the case of a servo amplifier #1 for example, the servo amplifier #1 transmits reception of a servo amplifier frame immediately after it has received a servo synchronization frame, but transmits a servo synchronization signal with a delay of the servo synchronization signal output delay time X. In the case of a servo amplifier #37 connected most downstream, the servo amplifier #37 outputs a servo synchronization signal immediately after it has received a servo synchronization frame, but transmits reception of a servo amplifier frame with a delay of the transmission timing Y37.

A servo amplifier according to Embodiment 4, receiving a servo synchronization frame, outputs a servo synchronization signal when the servo amplifier connected most downstream has received a servo synchronization frame. This allows correction of out-of-synchronization between servo amplifiers caused by a transmission delay so that a synchronization timing is provided, thereby performing synchronization processing of a plurality of servo amplifiers constituting an NC system. Reception of a servo synchronization frame is transmitted with a timing calculated based on the connection information on the peripheral devices obtained in initial communications. This prevents overlapping of transmission/reception timings caused by a transmission delay due to data processing.

Embodiment 5

Figure 12:
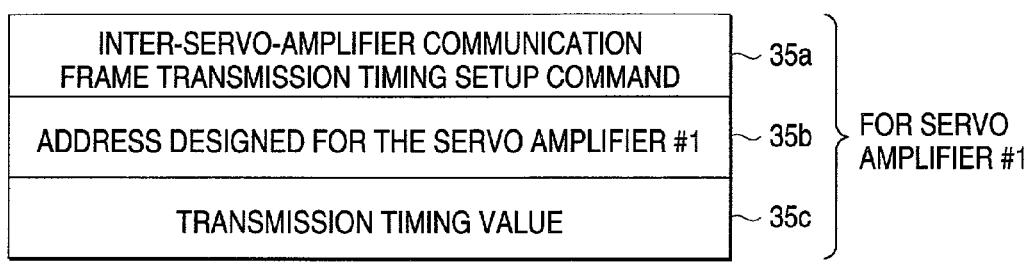
FIGS. 12(*a*) and 12(*b*) shows a transmit frame transmission timing setup command for communications between servo amplifiers in an NC system according to Embodiment 5 of the invention.
Figure 12:
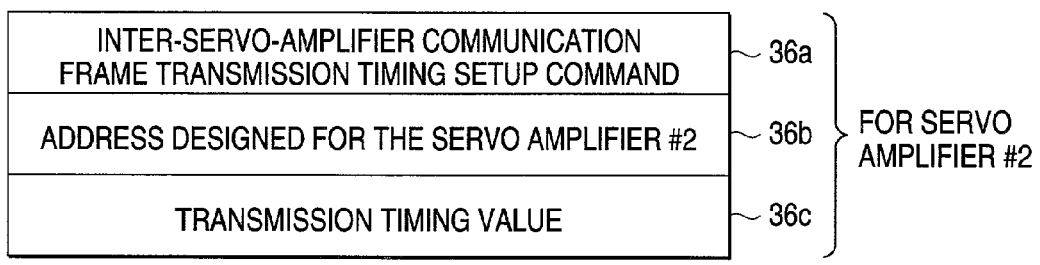

FIG. 12 shows a transmit frame transmission timing setup command for communications between servo amplifiers in an NC system according to Embodiment 5 of the invention. In the figure, a numeral 35 represents an inter-servo-amplifier communication frame transmission timing setup command transmitted from NC apparatus to a servo amplifier #1, 35a an inter-servo-amplifier communication frame transmission timing setup command, 35b an address destined for the servo amplifier #1, and 35c a transmission timing value. A numeral 36 represents an inter-servo-amplifier communication frame transmission timing setup command transmitted from NC apparatus to a servo amplifier #2, 36a an inter-servo-amplifier communication frame transmission timing setup command, 36b an address destined for the servo amplifier #2, and 36c a transmission timing value.

When communications between servo amplifiers, in step S8 in the flowchart for initial communications on NC apparatus shown earlier in FIG. 8, the NC apparatus recognizes the number of peripheral devices connected as an NC system and the connection order then calculates a reception timing and a transmission timing as well as calculates a transmission timing for the servo amplifier #1 to transmit a communication frame #11 and a transmission timing for the servo amplifier #2 to transmit a communication frame #12 based on the data volume of communication frames transmitted from the NC apparatus to servo amplifiers, the data volume of the communication frame #11 which the servo amplifier #1 transmits to the servo amplifier #2 and the data volume of the communication frame #12 which the servo amplifier #2 transmits to the servo amplifier #3, then transmits an inter-servo-amplifier communication frame transmission timing setup command 35, 36 to a servo amplifier.

In step S26 in the flowchart for initial communications on a peripheral device shown earlier in FIGS. 9 and 10, a servo amplifier that performs communications between servo amplifiers retains a reception timing and a transmission timing transmitted from NC apparatus as well as retains an inter-servo-amplifier communication frame transmission timing setup command 35, 36 transmitted from the NC apparatus.

A servo amplifier that performs communications between servo amplifiers performs communications between servo amplifiers based on the inter-servo-amplifier communication frame transmission timing setup command 35, 36 without overlapping the communications between servo amplifiers on the communications from NC apparatus to a servo amplifier.

Figure 13:
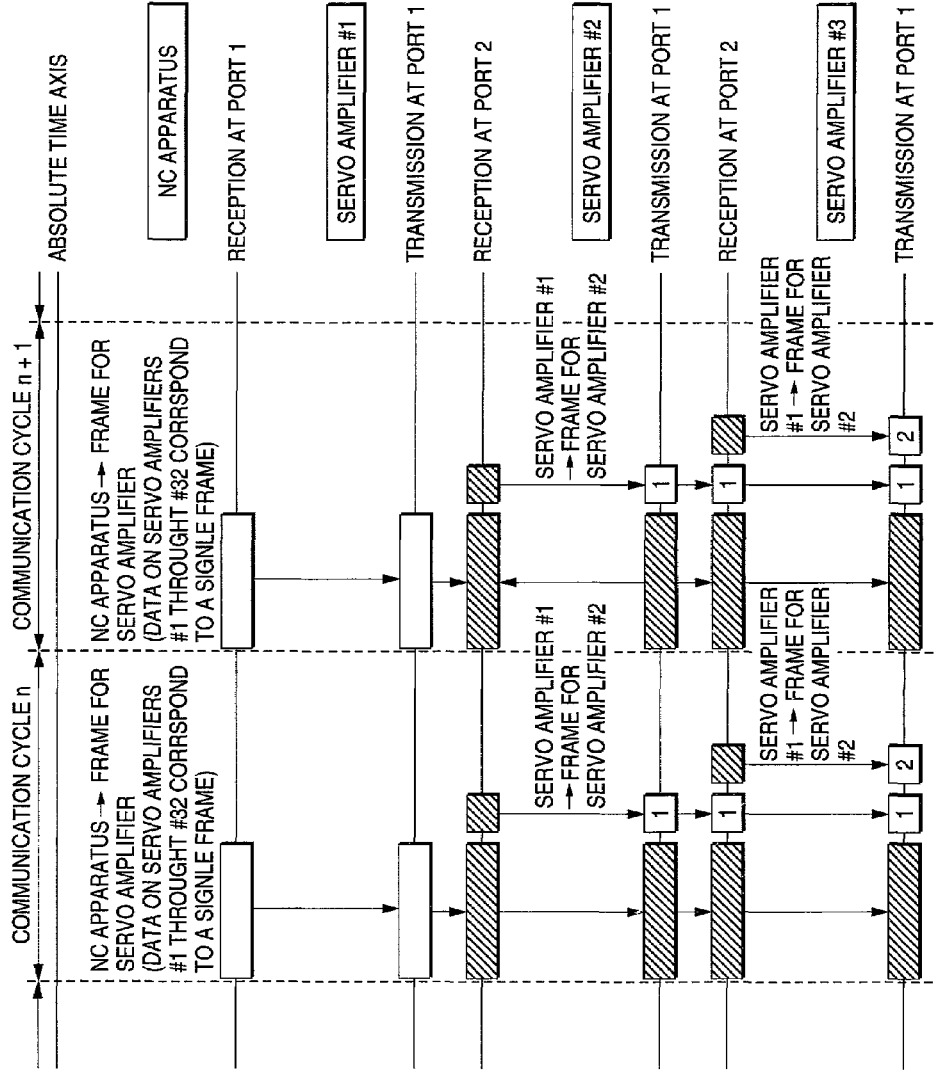
FIG. 13 shows a flow of data transmitted fromNC apparatus to servo amplifiers in an NC system according to Embodiment 5 of the invention.
Figure 14:
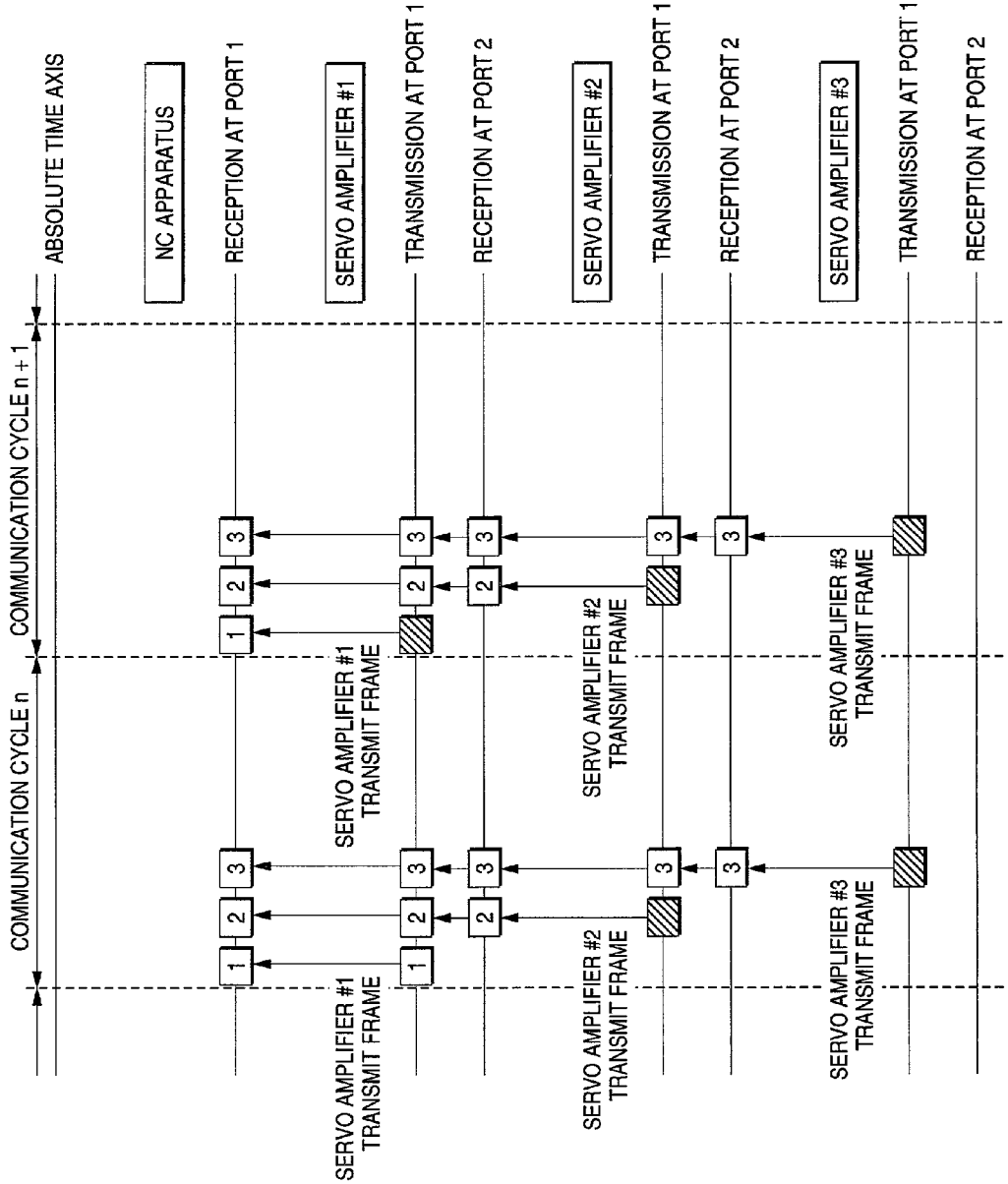
FIG. 14 shows a flow of data transmitted from servo amplifiers to NC apparatus in an NC system according to Embodiment 5 of the invention.

FIG. 13 shows a flow of data transmitted from NC apparatus to servo amplifiers in an NC system according to Embodiment 5 of the invention. FIG. 14 shows a flow of data transmitted from servo amplifiers to NC apparatus in an NC system according to Embodiment 5 of the invention. In the figure, data flow is explained taking as an example an NC system where NC apparatus, a servo amplifier #1, a servo amplifier #2 and a servo amplifier #3 are daisy-chained.

The NC apparatus transmits communication data from Port 1 to the servo amplifier #1.

The servo amplifier #1, receiving at Port 1 communication data transmitted from the NC apparatus, transmits a servo amplifier #1 transmit frame from Port 1 to NC apparatus. Then, the servo amplifier #1 transmits from Port 2 to the servo amplifier #2 communication data transmitted from the NC apparatus and communication data #11 passed from the servo amplifier #1 to the servo amplifier #2.

The servo amplifier #2, receiving at Port 1 communication data transmitted from the NC apparatus via the servo amplifier #1 and communication data #11 from the servo amplifier #1, transmits servo amplifier #1 transmit frame from Port 1. Then, the servo amplifier #2 transmits from Port 2 to the servo amplifier #3 communication data transmitted from the NC apparatus and communication data #12 passed from the servo amplifier #2 to the servo amplifier #3. In this case, when the address in the communication frame of communication data #11 from the servo amplifier #1 specifies the servo amplifier #3 also, the servo amplifier #2 also transmits communication data #11 to the servo amplifier #3.

The servo amplifier #3, receiving at Port 1 communication data transmitted from the NC apparatus via the servo amplifier #1 and the servo amplifier #2, communication data #11 from the servo amplifier #1 and communication data #12 from the servo amplifier #2, transmits servo amplifier #3 transmit frame from Port 1.

The servo amplifier #2, receiving at Port 2 servo amplifier #3 transmit frame from the servo amplifier #3, transmits the servo amplifier #3 transmit frame from Port 1 to the servo amplifier #1.

The servo amplifier #1, receiving at Port 2 servo amplifier #2 transmit frame or servo amplifier #3 transmit frame from the servo amplifier #2, transmits the servo amplifier #1 transmit frame 1 or servo amplifier #3 transmit frame from Port 1 to the NC apparatus.

The NC apparatus receives at Port 1 the servo amplifier #1 transmit frame, servo amplifier #2 transmit frame and servo amplifier #3 transmit frame transmitted from the servo amplifier #1.

While the foregoing example explains the operation of servo amplifiers specified in the address of a communication frame in communications between servo amplifiers, servo amplifiers to perform communications between servo amplifiers may be specified as a common address.

According to Embodiment 5, communications between servo amplifiers is possible not via NC apparatus so that high-speed inter-shaft correction is allowed.

In communications using related art optical transmission modules. ALM information is only transmitted in upstream direction of the connection so that servo amplifiers downstream in the connection of a servo amplifier where an alarm has taken place cannot receive the corresponding ALM information. These servo recognizes the ALM information only when they have received a communication frame the NC apparatus transmitted after receiving the ALM information. In Embodiment 5, it is possible to promptly transmit ALM information also to servo amplifiers downstream in the connection of a servo amplifier where an alarm has taken place.

While communications between servo amplifiers are described in the foregoing example, communications between peripheral devices including servo amplifiers, spindle amplifiers and remote I/O units that constitute an NC unit are likewise possible and corresponding description is omitted.

Communications between a driving amplifier (servo amplifier, spindle amplifier) and a remote I/O unit are made available so that a driving amplifier can directly fetch data from a remote I/O unit for high-speed processing.

Embodiment 6

Figure 15:
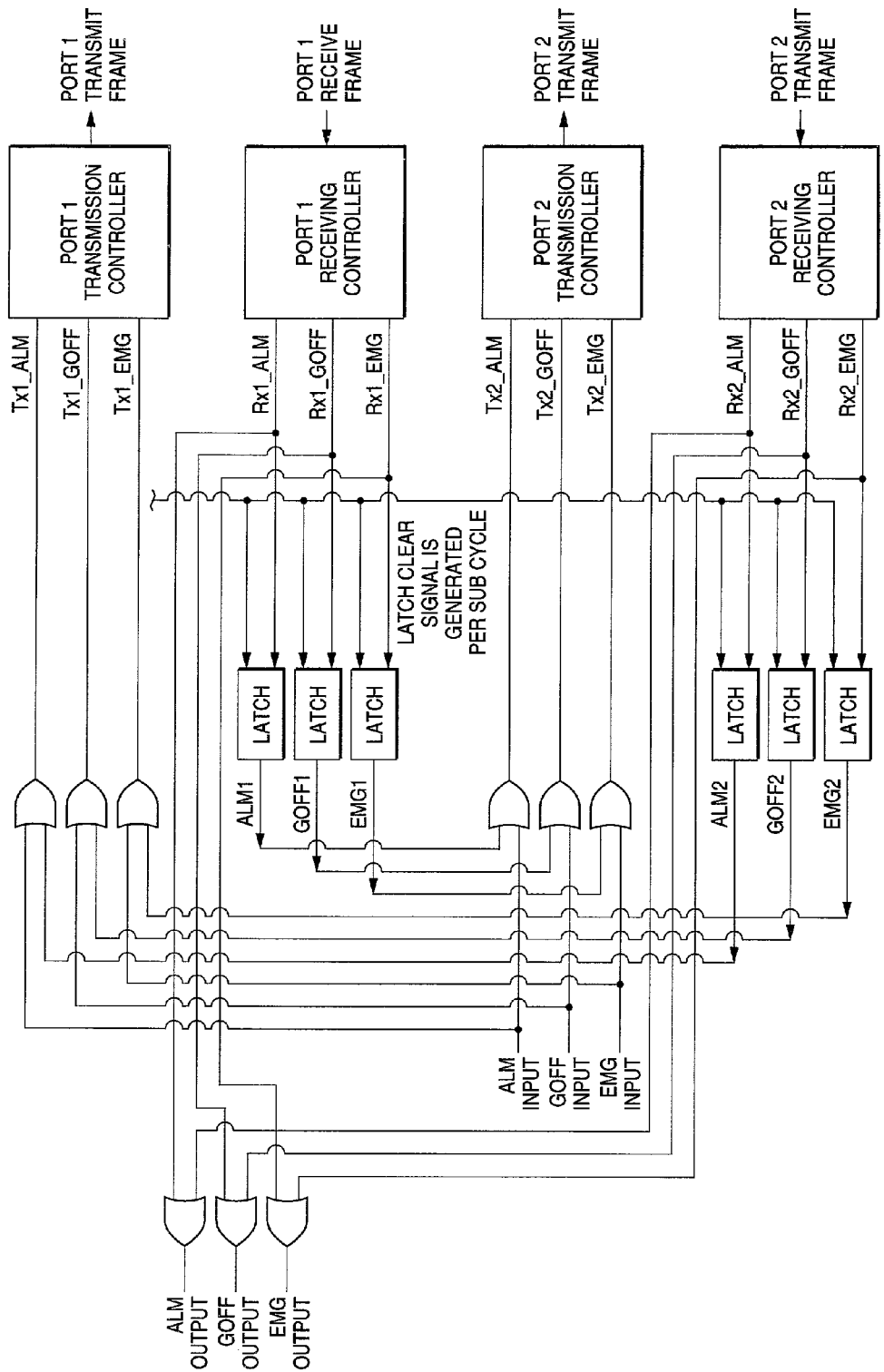
FIG. 15 is a logic diagram showing a feature to relay-transmit an emergency stop related signal in a communication controller in an NC system according to Embodiment 6 of the invention.

FIG. 15 is a logic diagram showing a feature to relay-transmit an emergency stop related signal in a communication controller in an NC system according to Embodiment 6 of the invention.

In case a communication frame received by a Port 1 receiving controller/Port 2 receiving controller includes information related to emergency stop (Rx1-ALM/Rx2-ALM, Rx1-GOFF/Rx2-GOFF, Rx1-EMG/Rx2-EMG), output processing such as ALM output, GOFF output and EMG output is performed. The information related to emergency stop (Rx1-ALM/Rx2-ALM, Rx1-GOFF/Rx2-GOFF, Rx1-EMG/Rx2-EMG) is latched (ALM1/ALM2, GOFF1/GOFF2, EMG1/EMG2) and emergency stop information (Tx1-ALM/Tx2-ALM, Tx1-GOFF/Tx2-GOFF, Tx1-EMG/Tx2-EMG) is appended to a communication frame to be transmitted from the Port 1 transmission controller/Port 2 transmission controller, together with information related to emergency stop such as ALM input, GOFF input and EMG input.

In communications using related art optical transmission modules, in case transmission abnormalities such as a bit error caused by a noise during data processing of information related to emergency stop in a driving amplifier in transmitting/receiving a signal related to emergency stop such as ALM, GOFF, and EMG, information related to emergency stop is not conveyed to the NC apparatus within the communication cycle thus causing a delay in emergency stop. IN Embodiment 6, the emergency stop information is relay-transmitted thus reducing the risk of delay in conveyance of emergency stop information caused by transmission errors.

Embodiment 7

Figure 16:
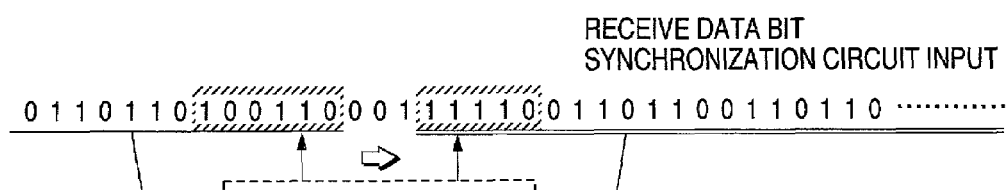
FIGS. 16(*a*) and 16(*b*) shows a feature to prevent occurrence of an unnecessary start flag in a communication control buffer in an NC system according to Embodiment 7 of the invention.
Figure 16:
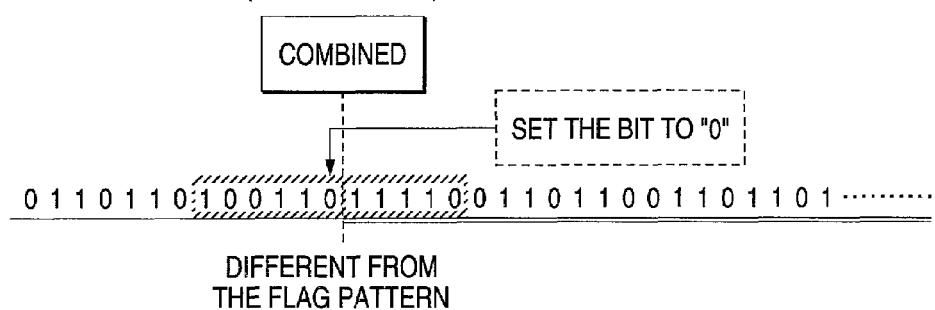

FIG. 16 shows a feature to prevent occurrence of an unnecessary start flag in a communication control buffer in an NC system according to Embodiment 7 of the invention.

In order to prevent a specific pattern as a flag from occurring during data processing of effective data in communications using optical transmission modules as a related art example, the number of data pieces in one-round transmit frame is limited so as to prevent the pointer passing phenomenon and the write pointer 92 is placed 16 bits apart from the read pointer each time the flag of a frame is received. Limitation n dummy data pieces is difficult in data processing of dummy data in idle state so that a countermeasure against occurrence of a specific bit pattern remains difficult.

For example, as shown in FIG. 16($a$), in case the read pointer has moved when data having the bit structure "011011010011" is being read with the specific bit pattern as a flag being "01111110" and the bit structure "001" is skipped and the next data to read has the bit structure "11110," the resulting bit structure is "01111110" which is a specific bit pattern serving as a flag, causing the bit pattern to be determined as a flag.

In Embodiment 7, In case the read pointer of bit FIFO in the communication control buffer (not shown) has passed the write pointer or in case the communication control buffer is reset, a bit pattern obtained after the read pointer has moved is changed so that it will not match a specific bit pattern serving as a flag. For example, as shown in FIG. 16($b$), in case the bit patterns combined in case the read pointer has moved results in the specific bit pattern "01111110" serving as a flag, a bit is changed to "0" to change the bit pattern to one that does not match the specific bit pattern serving as a flag.

Concerning the data processing of dummy data in idle state, it is also possible to prevent inadvertent occurrence of a bit pattern serving as a flag.

Embodiment 8

Figure 17:
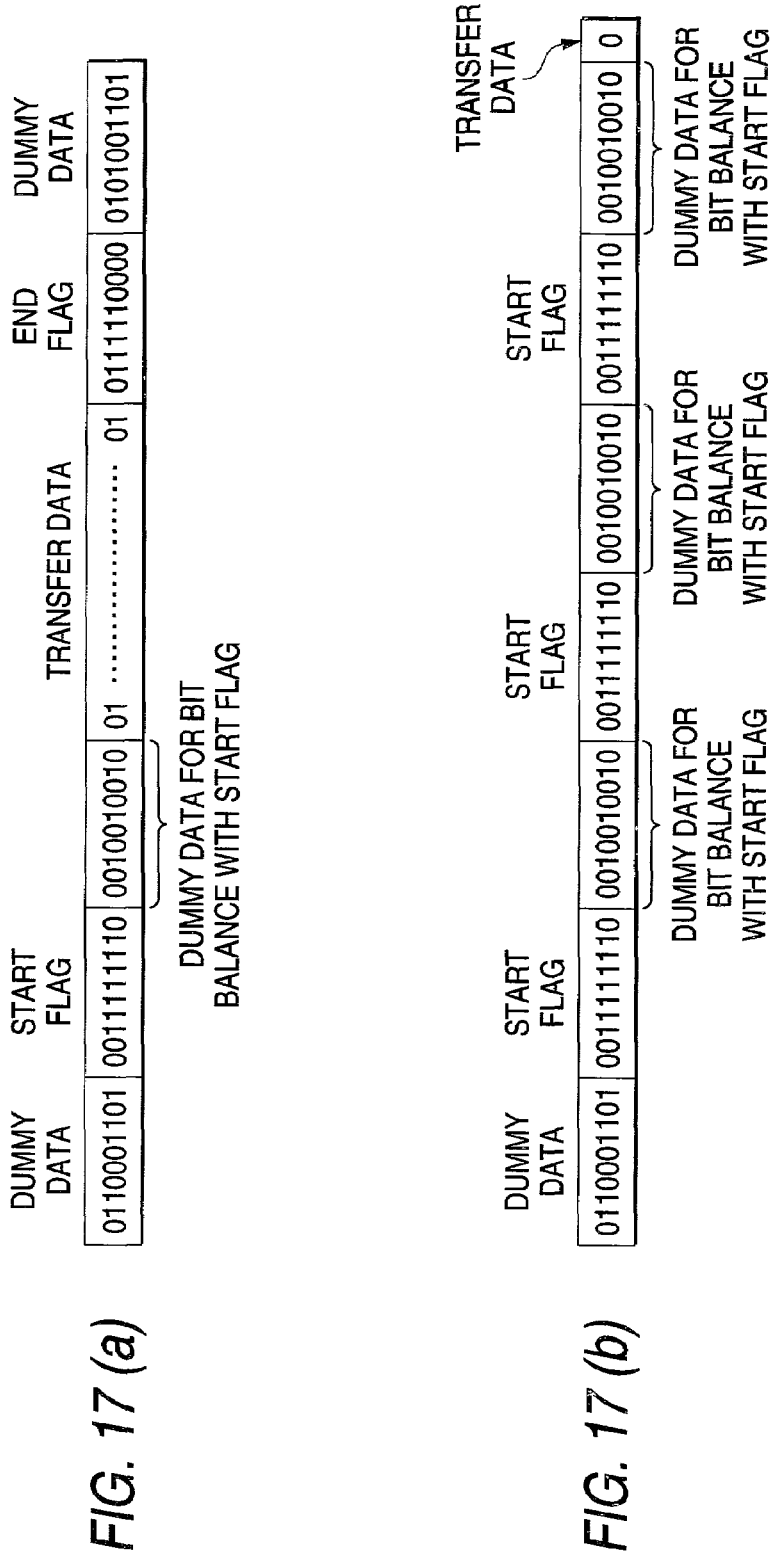
FIG. 17 shows a method for providing a balance with the bit count in a flag in data transmission using optical transmission modules in an NC system according to Embodiment 8 of the invention.
Figure 18:
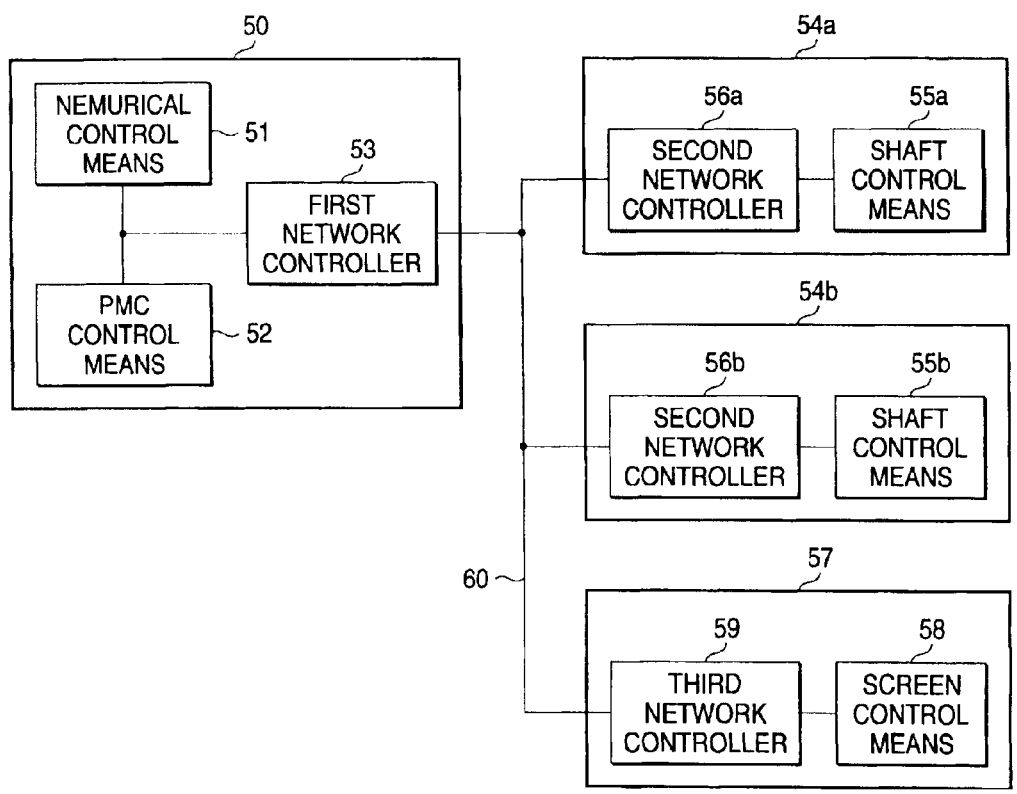
FIG. 18 shows a configuration of NC apparatus as a related art example.
Figure 19:
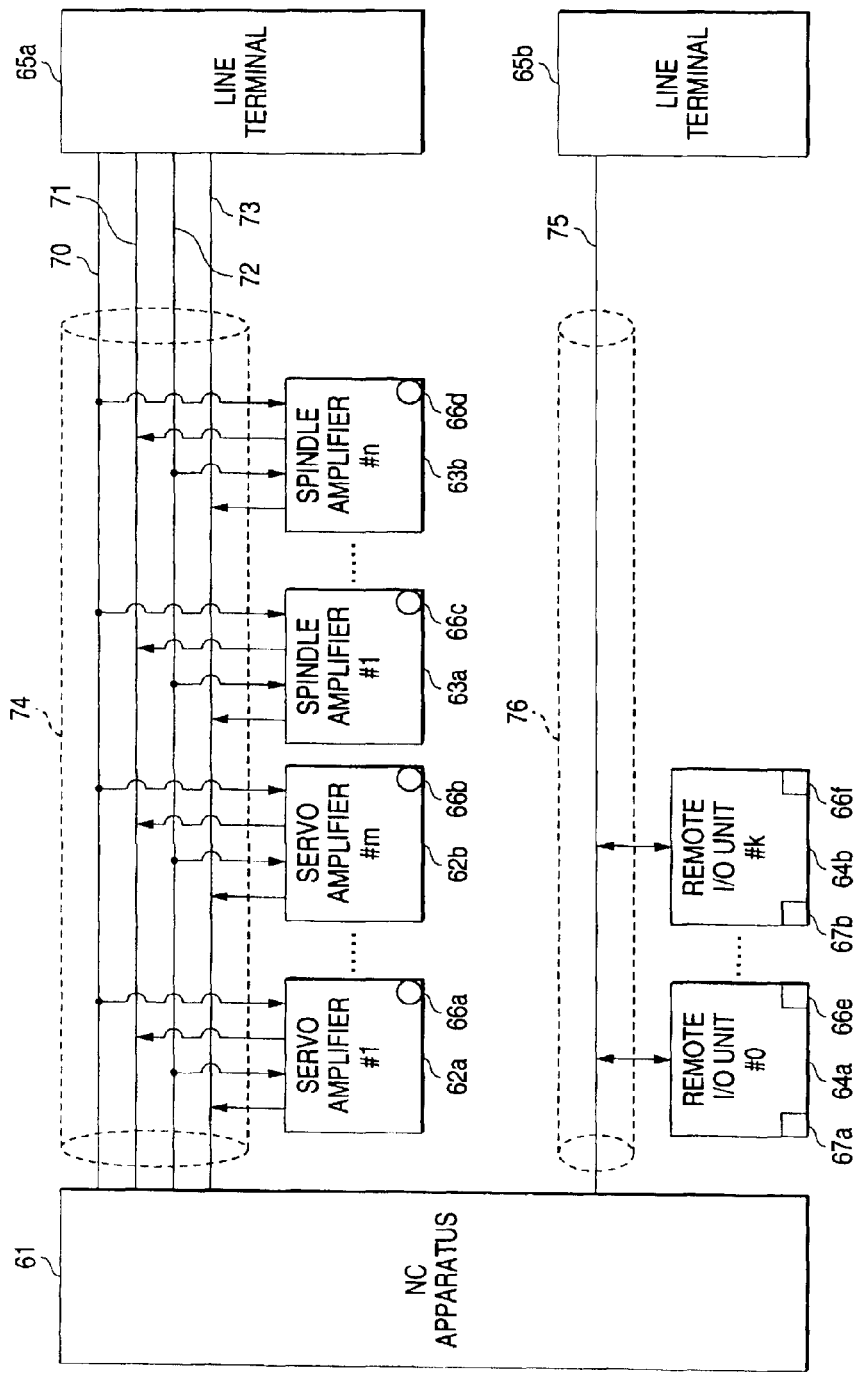
FIG. 19 shows a connection between NC apparatus, driving amplifiers and remote I/O units as a related art example.
Figure 20:
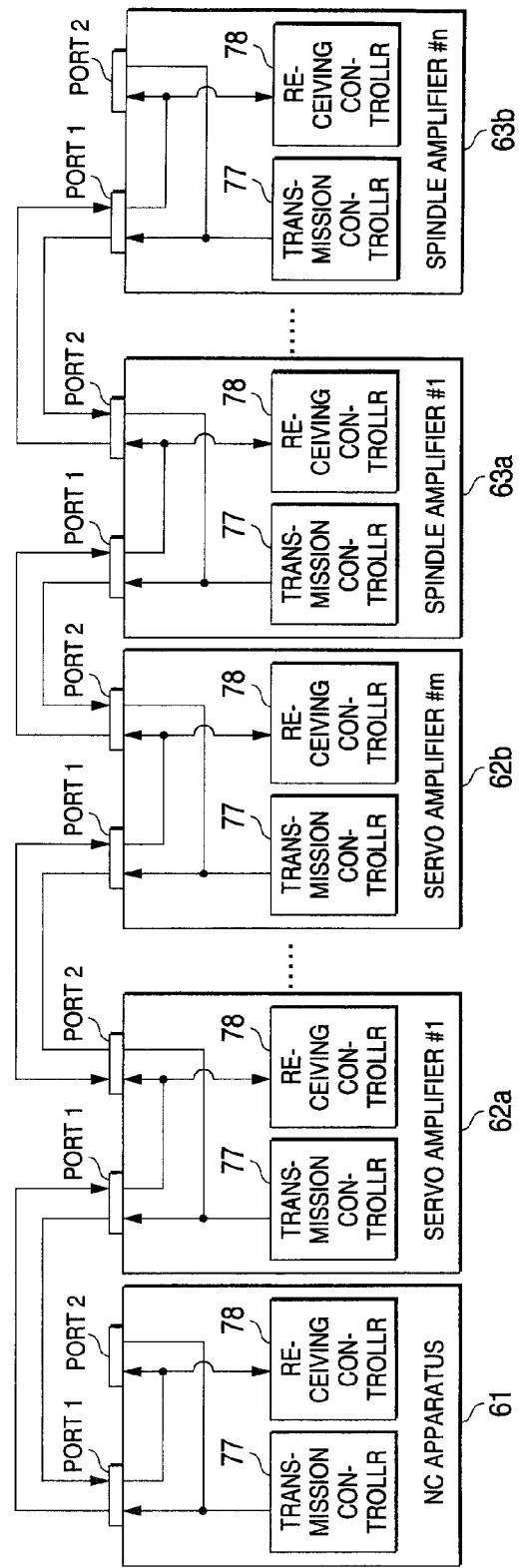
FIG. 20 shows a serial connection between NC apparatus and driving amplifiers as a related art example.

FIG. 17 shows a method for providing a balance with the bit count in a flag in data transmission using optical transmission modules in an NC system according to Embodiment 8 of the invention.

In FIG. 17($a$), in case the bit pattern of the start flag is "001111110" and dummy data provided at the head and tail of a transmit frame is "0110001101," after the start flag is transmitted, dummy data with the bit pattern changed to "0010010010" is transmitted in order to provide a balance of bit count with the start flag (the number of 1s is equal to the number of 0s for start flag+dummy data).

In FIG. 17(b), in case the bit pattern of the start flag is "001111110" and dummy data provided at the head and tail of a transmit frame is "0110001101," a plurality of combinations of a bit pattern and dummy data (three in the figure) are transmitted in order to provide a balance of start flag and bit count (the number of 1s is equal to the number of 0s for start flag+dummy data).

In Embodiment 8, the bit pattern of a start flag is combined with dummy data for transmission in order to provide a balance of start flag and bit count. Thus it is possible to readily solve the problem of imbalance between the incidence of 1s and 0s in a single communication cycle caused by a flag, thereby successfully extracting the data component and the clock component in the receive data.

INDUSTRIAL APPLICABILITY

As mentioned earlier, the invention allows high-speed and efficient communications between devices in a numerical control system having numerical control apparatus and peripheral devices composed of at least one of a servo amplifier, a spindle amplifier and a remote I/O unit, and enables automatic recognition of peripheral devices connected. Thus the invention is fit for use in a numerical control system where a large number of peripheral devices are included.

The invention claimed is:

1. A method for setting a communication timing in a numerical control system, the numerical control system comprising:
   a numerical control apparatus;
   a communication cable including a data transmission cable for data transmission and a data transmission cable for data reception; and peripheral devices including at least one of a servo amplifier, a spindle amplifier and a remote I/O unit, the peripheral devices serially connected with the numerical control apparatus through the communication cable in order to perform time-division-based communications between the numerical control apparatus and the peripheral devices,
the method comprising the steps of:
transmitting a port connection confirmation command to the peripheral devices in initial communications,
recognizing the connection state of the peripheral devices;
calculating the number of the peripheral devices connected and the transmission timing of the peripheral devices from the number of model codes and the order of model codes appended to a port information command when a response to the port connection confirmation command and the port information command are received from the peripheral devices; and
transmitting the calculated number of connections and transmission timing to the peripheral devices as a node count notice command and a communication timing setup command, and
transmitting the response to the port connection confirmation command to upstream nodes after the port connection confirmation command is received;
transmitting the port connection confirmation command to downstream nodes after the port connection confirmation command is received,
appending a model code allocated to the port information command in advance to transmitting the resulting port information command to upstream nodes;
retaining the number of connections and transmission timing specified in the node count notice command and communication timing setup command when the node count notice command and communication timing setup command are received,
wherein the communication timing of the peripheral devices is automatically set via initial communications between the numerical control apparatus and the peripheral devices.

* * * * *